US012732998B2

(12) United States Patent
Liu et al.

(10) Patent No.: US 12,732,998 B2
(45) Date of Patent: Sep. 8, 2026

(54) COMMUNICATION METHOD AND COMMUNICATION APPARATUS

(71) Applicant: HUAWEI TECHNOLOGIES CO., LTD., Shenzhen (CN)

(72) Inventors: Yunfeng Liu, Shenzhen (CN); Zhiheng Guo, Beijing (CN); Ruixiang Ma, Shenzhen (CN); Xinghua Song, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 177 days.

(21) Appl. No.: 18/737,104

(22) Filed: Jun. 7, 2024

(65) Prior Publication Data

US 2024/0323961 A1 Sep. 26, 2024

Related U.S. Application Data

(63) Continuation of application No. PCT/CN2022/138563, filed on Dec. 13, 2022.

(30) Foreign Application Priority Data

Dec. 13, 2021 (CN) ........................ 202111516823.6

(51) Int. Cl.
*H04W 72/1273* (2023.01)
*H04L 1/1812* (2023.01)
(Continued)

(52) U.S. Cl.
CPC ....... *H04W 72/1273* (2013.01); *H04L 1/1812* (2013.01); *H04W 72/0446* (2013.01); *H04W 72/0453* (2013.01)

(58) Field of Classification Search
CPC ......... H04W 72/1273; H04W 72/0446; H04W 72/0453; H04W 72/1268; H04L 1/1812;
(Continued)

(56) References Cited

U.S. PATENT DOCUMENTS

2019/0150181 A1* 5/2019 Kim ...................... H04L 1/1896 370/329
2020/0313803 A1* 10/2020 Khoshnevisan ...... H04L 1/1812
(Continued)

FOREIGN PATENT DOCUMENTS

WO 2024034108 A1 2/2024

*Primary Examiner* — Kwang B Yao
(74) *Attorney, Agent, or Firm* — Rimon PC

(57) ABSTRACT

A communication method and communication apparatus are provided. A terminal determines, from a first time-frequency resource, a target candidate physical downlink shared channel (PDSCH) reception occasion for receiving a PDSCH, the target candidate PDSCH reception occasion including at least one symbol. The terminal further determines a hybrid automatic repeat request-acknowledgment (HARQ-ACK) codebook based on a plurality of target candidate PDSCH reception occasions and sends the HARQ-ACK codebook to a network device. Time domain of the first time-frequency resource corresponds to a first time unit including one or more symbols, a frequency domain resource of the first time-frequency resource includes a plurality of consecutive non-overlapping subbands on one carrier, the one or more symbols in the first time unit have different symbol categories on the plurality of subbands.

20 Claims, 10 Drawing Sheets

(51) Int. Cl.
*H04W 72/0446* (2023.01)
*H04W 72/0453* (2023.01)

(58) Field of Classification Search
CPC . H04L 1/16; H04L 1/18; H04L 1/1854; H04L 1/1861; H04L 5/0044; H04L 5/0055; H04L 5/26
See application file for complete search history.

(56) References Cited

U.S. PATENT DOCUMENTS

2020/0313809 A1* 10/2020 Park ...................... H04L 1/1861
2021/0391955 A1* 12/2021 He ........................ H04L 5/0053
2022/0385412 A1* 12/2022 Zhang ................... H04L 1/1614

* cited by examiner

COMMUNICATION METHOD AND COMMUNICATION APPARATUS

CROSS-REFERENCE TO RELATED APPLICATIONS

This application is a continuation of International Application No. PCT/CN2022/138563, filed on Dec. 13, 2022, which claims priority to Chinese Patent Application No. 202111516823.6, filed on Dec. 13, 2021. The disclosures of the aforementioned applications are hereby incorporated by reference in their entireties.

TECHNICAL FIELD

This application relates to the communication field, and in particular, to a communication method and a communication apparatus.

BACKGROUND

To improve uplink coverage, a subband full duplex (SBFD) solution is proposed. Based on the SBFD solution, one component carrier (CC) (which may be referred to as a carrier for short) may include a plurality of subbands, the plurality of subbands are consecutive non-overlapping frequency domain resources in frequency domain resources of the carrier, and symbols in one or more time units have different symbol categories on the plurality of subbands. For example, a same symbol is configured as an uplink (U) symbol on some subbands, and is configured as a downlink (D) symbol on some other subbands. In this way, a subband U and a subband D may exist in a same CC at the same time, that is, simultaneous receiving and sending may be implemented on one CC.

However, when the SBFD solution is used, how to send and receive a hybrid automatic repeat request-acknowledgment (HARQ-ACK) codebook is an urgent technical problem to be resolved.

SUMMARY

This application provides a communication method and a communication apparatus, to properly use a resource in a use scenario of an SBFD solution, to implement normal transmission of a HARQ-ACK codebook.

According to a first aspect, this application provides a communication method. The method may be performed by a terminal, or may be performed by a component (such as a chip or a chip system) configured in a terminal, or may be implemented by a logical module or software that can implement all or some functions of a terminal. This is not limited in this application.

For example, the method includes: The terminal determines a target candidate physical downlink shared channel (PDSCH) reception occasion (occasion for candidate PDSCH reception) from a first time-frequency resource, where the target candidate PDSCH reception occasion includes at least one symbol, the target candidate PDSCH reception occasion is used to receive a PDSCH, the first time-frequency resource corresponds to a first time unit in time domain, the first time unit includes one or more symbols, a frequency domain resource corresponding to the first time-frequency resource includes a plurality of subbands, the plurality of subbands are consecutive non-overlapping frequency domain resources on the frequency domain resource corresponding to the first time-frequency resource, the plurality of subbands are on one carrier, the one or more symbols in the first time unit have different symbol categories on the plurality of subbands, and each symbol included in the target candidate PDSCH reception occasion satisfies: a symbol category on at least one of the plurality of subbands is downlink, flexible (F), or full duplex (FD), or a symbol category on a first subband in the plurality of subbands is downlink, flexible, or full duplex. The terminal determines a HARQ-ACK codebook based on a plurality of target candidate PDSCH reception occasions. The terminal sends the HARQ-ACK codebook.

The first time-frequency resource corresponds to the first time unit in time domain, and the first time unit includes the one or more symbols. The frequency domain resource corresponding to the first time-frequency resource includes the plurality of subbands, the plurality of subbands are consecutive non-overlapping frequency domain resources on the frequency domain resource corresponding to the first time-frequency resource, the plurality of subbands are on one carrier, and the one or more symbols in the first time unit have different symbol categories on the plurality of subbands. This may be understood as a subband full duplex scenario.

That a category of a symbol on a subband is full duplex may be understood as that uplink transmission and downlink transmission may be simultaneously performed in the symbol on a frequency domain resource corresponding to the subband.

Based on the foregoing solution, in a use scenario of an SBFD solution, the terminal may determine the target candidate PDSCH reception occasion from a plurality of candidate PDSCH reception occasions based on a definition of the target candidate PDSCH candidate occasion, and then determine the HARQ-ACK codebook. A network device may determine the target candidate PDSCH reception occasion based on a same method, and then determine a payload size of the HARQ-ACK codebook, so that the HARQ-ACK codebook can be correctly received. In this way, normal transmission of the HARQ-ACK codebook is implemented.

In addition, because each symbol in the target candidate PDSCH reception occasion satisfies that a symbol category on at least one subband is downlink, flexible, or full duplex, it means that on a same symbol, there may be at least one subband on which a symbol category is uplink. In this way, the network device can schedule downlink data on a downlink subband of a CC and receive uplink data on an uplink subband of the same CC as much as possible, that is, can perform uplink and downlink transmission on the same CC at the same time. Therefore, resource utilization is improved.

With reference to the first aspect, in some possible implementations, the first subband is a subband with a highest priority in the plurality of subbands.

In this way, the subbands are classified into different priorities, so that resources in subbands with different priorities can be properly utilized. Only whether a symbol category of each symbol included in a candidate PDSCH reception occasion in a subband with a highest priority is downlink, flexible, or full duplex is considered, so that utilization of a resource in a subband with a high priority can be ensured.

With reference to the first aspect, in some possible implementations, the first subband is a subband specified by a network device in the plurality of subbands.

Therefore, the terminal does not need to perform additional calculation or determining, and needs only to determine the first subband based on indication information of the network device, and then determine the target candidate PDSCH reception occasion based on the foregoing target candidate PDSCH determining process. This can reduce power consumption of the terminal to some extent.

According to a second aspect, this application provides a communication method. The method may be performed by a network device, or may be performed by a component (such as a chip or a chip system) configured in a network device, or may be implemented by a logical module or software that can implement all or some functions of a network device. This is not limited in this application.

For example, the method includes: The network device determines a target candidate PDSCH reception occasion from a first time-frequency resource configured for a terminal, where the target candidate PDSCH reception occasion includes at least one symbol, the target candidate PDSCH reception occasion is used by the terminal to receive a PDSCH, the first time-frequency resource corresponds to a first time unit in time domain, the first time unit includes one or more symbols, a frequency domain resource corresponding to the first time-frequency resource includes a plurality of subbands, the plurality of subbands are consecutive non-overlapping frequency domain resources on the frequency domain resource corresponding to the first time-frequency resource, the plurality of subbands are on one carrier, the one or more symbols in the first time unit have different symbol categories on the plurality of subbands, and each symbol included in the target candidate PDSCH reception occasion satisfies: a symbol category on at least one of the plurality of subbands is downlink, flexible, or full duplex, or a symbol category on a first subband in the plurality of subbands is downlink, flexible, or full duplex. The network device determines a payload size of a HARQ-ACK codebook of the terminal based on a plurality of target candidate PDSCH reception occasions of the terminal. The network device receives the HARQ-ACK codebook from the terminal based on the payload size of the HARQ-ACK codebook.

Based on the foregoing solution, in a subband full duplex scenario, the network device may determine, as the target candidate PDSCH reception occasion, a candidate PDSCH reception occasion in the first time-frequency resource configured for the terminal, where a symbol category of each symbol included in the candidate PDSCH reception occasion on at least one of the plurality of subbands is downlink, flexible, or full duplex; or the network device may determine, as the target candidate PDSCH reception occasion, a candidate PDSCH reception occasion in the first time-frequency resource configured for the terminal, where a symbol category of each symbol included in the candidate PDSCH reception occasion on the first subband in the plurality of subbands is downlink, flexible, or full duplex. Then, the network device may determine, based on a plurality of target candidate PDSCH reception occasions, a payload size of a HARQ-ACK codebook that may be generated by the terminal, and receive the HARQ-ACK codebook from the terminal based on the payload size of the HARQ-ACK codebook. In this way, feedback information from the terminal may be further properly received by using a subband on which a symbol category is downlink, flexible, or full duplex in the first time unit.

With reference to the second aspect, in some possible implementations, the first subband is a subband with a highest priority in the plurality of subbands.

In this way, the subbands are classified into different priorities, so that resources in subbands with different priorities can be properly utilized. Only whether a symbol category of each symbol included in a candidate PDSCH reception occasion in a subband with a highest priority is downlink, flexible, or full duplex is considered, so that utilization of a resource in a subband with a high priority can be ensured.

With reference to the second aspect, in some possible implementations, the first subband is a subband specified by a network device in the plurality of subbands.

The network device indicates the first subband to the terminal by using indication information. The terminal does not need to perform additional calculation or determining, and needs only to determine the first subband based on the indication information of the network device, and then determine the target candidate PDSCH reception occasion based on the foregoing target candidate PDSCH determining process. This can reduce power consumption of the terminal to some extent.

According to a third aspect, this application provides a communication method. The method may be performed by a terminal, or may be performed by a component (such as a chip or a chip system) configured in a terminal, or may be implemented by a logical module or software that can implement all or some functions of a terminal. This is not limited in this application.

For example, the method includes: The terminal determines, from a plurality of physical uplink control channel (PUCCH) resource sets, a first PUCCH resource set and a second PUCCH resource set that correspond to a payload size of a HARQ-ACK codebook, where all PUCCH resources included in each of the plurality of PUCCH resource sets are in a frequency domain resource of a second time-frequency resource in frequency domain, the second time-frequency resource corresponds to a second time unit in time domain, the second time unit includes one or more symbols, the frequency domain resource corresponding to the second time-frequency resource includes a plurality of subbands, the plurality of subbands are consecutive non-overlapping frequency domain resources on the frequency domain resource corresponding to the second time-frequency resource, the plurality of subbands are on one carrier, the one or more symbols in the second time unit have different symbol categories on the plurality of subbands, the first PUCCH resource set is a resource set including at least one first PUCCH resource, the first PUCCH resource satisfies: a frequency domain resource of the first PUCCH resource is in one of the plurality of subbands, and a symbol category, of a time domain resource corresponding to the first PUCCH resource in the second time unit, on the subband to which the first PUCCH resource belongs is uplink, flexible, or full duplex, and the HARQ-ACK codebook is generated by the terminal. The terminal determines a target PUCCH resource set from the first PUCCH resource set and the second PUCCH resource set. The terminal determines a PUCCH resource in the target PUCCH resource set as a target PUCCH resource. The terminal sends the HARQ-ACK codebook on the target PUCCH resource.

The second time-frequency resource corresponds to the second time unit in time domain, the second time unit includes the one or more symbols, the frequency domain resource corresponding to the second time-frequency resource includes the plurality of subbands, the plurality of subbands are consecutive non-overlapping frequency domain resources on the frequency domain resource corresponding to the second time-frequency resource, the plurality of subbands are on one carrier, and the one or more symbols in the second time unit have different symbol categories on the plurality of subbands. This may also be understood as a subband full duplex scenario.

Based on the foregoing solution, in a use scenario of an SBFD solution, some PUCCH resource sets in a plurality of PUCCH resource sets configured by a network device for the terminal include at least one PUCCH resource that does not cross subbands. In this way, the terminal may flexibly select a PUCCH resource to transmit the HARQ-ACK codebook, to avoid a case in which no PUCCH resource is available for transmitting the HARQ-ACK codebook because all PUCCH resources cross subbands, thereby ensuring normal transmission of the HARQ-ACK codebook and ensuring transmission reliability. In addition, the terminal may transmit the HARQ-ACK codebook by using an uplink subband, or may transmit the HARQ-ACK codebook by using a full-band resource. Therefore, resource utilization is improved.

With reference to the third aspect, in some possible implementations, all resources included in the first PUCCH resource set are first PUCCH resources; and that the terminal determines a target PUCCH resource set from the first PUCCH resource set and the second PUCCH resource set includes: The terminal determines the first PUCCH resource set as the target PUCCH resource set.

The network device and the terminal may determine the target PUCCH resource set based on a same rule, so that the target PUCCH resource set can be determined without additional signaling exchange.

With reference to the third aspect, in some possible implementations, that the terminal determines a target PUCCH resource set from the first PUCCH resource set and the second PUCCH resource set includes: The terminal receives first indication information from a network device, where the first indication information includes a bitmap of N bits, the N bits correspond to N time units, a value of an $n^{th}$ bit in the bitmap indicates a PUCCH resource set that is in the first PUCCH resource set and the second PUCCH resource set and that corresponds to an $n^{th}$ time unit in the N time units, $1 \le n \le N$, and N and n are integers; and the terminal determines the target PUCCH resource set based on a value of a bit corresponding to the second time unit in the bitmap.

The network device and the terminal exchange the first indication information once, so that the terminal can determine target PUCCH resource sets in a plurality of time units including the second time unit in each cycle. This can avoid excessive power consumption caused by excessive signaling exchange on the network device and the terminal.

With reference to the third aspect, in some possible implementations, that the terminal determines a target PUCCH resource set from the first PUCCH resource set and the second PUCCH resource set includes: The terminal receives second indication information from a network device, where the second indication information includes an identifier of a PUCCH resource set; and the terminal determines a PUCCH resource set corresponding to the identifier in the first PUCCH resource set and the second PUCCH resource set as the target PUCCH resource set.

The network device specifies a PUCCH resource set for the terminal as the target PUCCH resource set, and the terminal does not need to perform additional calculation or determining, so that no additional power consumption is brought to the terminal.

According to a fourth aspect, this application provides a communication method. The method may be performed by a network device, or may be performed by a component (such as a chip or a chip system) configured in a network device, or may be implemented by a logical module or software that can implement all or some functions of a network device. This is not limited in this application.

For example, the method includes: The network device configures a plurality of PUCCH resource sets for a terminal, where all PUCCH resources included in each of the plurality of PUCCH resource sets are in a frequency domain resource of a second time-frequency resource in frequency domain, the second time-frequency resource corresponds to a second time unit in time domain, the second time unit includes one or more symbols, the frequency domain resource corresponding to the second time-frequency resource includes a plurality of subbands, the plurality of subbands are consecutive non-overlapping frequency domain resources on the frequency domain resource corresponding to the second time-frequency resource, the plurality of subbands are on one carrier, and the one or more symbols in the second time unit have different symbol categories on the plurality of subbands. The network device determines, from the plurality of PUCCH resource sets, a first PUCCH resource set and a second PUCCH resource set that correspond to a payload size of a HARQ-ACK codebook, where the first PUCCH resource set is a resource set including at least one first PUCCH resource, the first PUCCH resource satisfies: a frequency domain resource of the first PUCCH resource is in one of the plurality of subbands, and a symbol category, of a time domain resource corresponding to the first PUCCH resource in the second time unit, on the subband to which the first PUCCH resource belongs is uplink, flexible, or full duplex, and the HARQ-ACK codebook is generated by the terminal. The network device determines a target PUCCH resource set from the first PUCCH resource set and the second PUCCH resource set. The network device determines a PUCCH resource in the target PUCCH resource set as a target PUCCH resource. The network device receives the HARQ-ACK codebook on the target PUCCH resource.

Based on the foregoing solution, in a use scenario of an SBFD solution, the network device may configure the plurality of PUCCH resource sets for the terminal, and some PUCCH resource sets in these resource sets include at least one PUCCH resource that does not cross subbands. In this way, the network device may flexibly select a PUCCH resource to receive the HARQ-ACK codebook, to avoid a case in which no PUCCH resource is available for receiving the HARQ-ACK codebook because all PUCCH resources cross subbands, thereby ensuring normal transmission of the HARQ-ACK codebook and ensuring transmission reliability. In addition, the terminal may transmit the HARQ-ACK codebook by using an uplink subband, or may transmit the HARQ-ACK codebook by using a full-band resource. Therefore, resource utilization is improved.

With reference to the fourth aspect, in some possible implementations, all resources included in the first PUCCH resource set are first PUCCH resources; and that the network device determines a target PUCCH resource set from the first PUCCH resource set and the second PUCCH resource set includes: The network device determines the first PUCCH resource set as the target PUCCH resource set.

The network device and the terminal may determine the target PUCCH resource set based on a same rule, so that the target PUCCH resource set can be determined without additional signaling exchange.

With reference to the fourth aspect, in some possible implementations, the method further includes: The network device sends first indication information to the terminal, where the first indication information includes a bitmap of N bits, the N bits correspond to N time units, a value of an $n^{th}$ bit in the bitmap indicates a target PUCCH resource set corresponding to an $n^{th}$ time unit in the N time units, $1 \le n \le N$, and N and n are integers. That the network device determines a target PUCCH resource set from the first PUCCH resource set and the second PUCCH resource set includes: The network device determines the target PUCCH resource set based on a value of a bit corresponding to the second time unit in the bitmap.

The network device and the terminal exchange the first indication information once, so that the terminal can determine target PUCCH resource sets in a plurality of time units including the second time unit in each cycle. This can avoid excessive power consumption caused by excessive signaling exchange on the network device and the terminal.

With reference to the fourth aspect, in some possible implementations, the method further includes: The network device sends second indication information to the terminal, where the second indication information includes an identifier of a PUCCH resource set. That the network device determines a target PUCCH resource set from the first PUCCH resource set and the second PUCCH resource set includes: The network device determines a PUCCH resource set corresponding to the identifier in the first PUCCH resource set and the second PUCCH resource set as the target PUCCH resource set.

The network device specifies a PUCCH resource set for the terminal as the target PUCCH resource set, and the terminal does not need to perform additional calculation or determining, so that no additional power consumption is brought to the terminal.

According to a fifth aspect, this application provides a communication method. The method may be performed by a network device, or may be performed by a component (such as a chip or a chip system) configured in a network device, or may be implemented by a logical module or software that can implement all or some functions of a network device. This is not limited in this application.

For example, the method includes: The network device configures a plurality of PUCCH resource sets for a terminal, where each of the plurality of PUCCH resource sets includes at least one first PUCCH resource, all PUCCH resources included in each of the plurality of PUCCH resource sets are in a frequency domain resource of a second time-frequency resource in frequency domain, the second time-frequency resource corresponds to a second time unit in time domain, the second time unit includes one or more symbols, the frequency domain resource corresponding to the second time-frequency resource includes a plurality of subbands, the plurality of subbands are consecutive non-overlapping frequency domain resources on the frequency domain resource corresponding to the second time-frequency resource, the plurality of subbands are on one carrier, the one or more symbols in the second time unit have different symbol categories on the plurality of subbands, and the first PUCCH resource satisfies: a frequency domain resource of the first PUCCH resource is in one of the plurality of subbands, and a symbol category, of a time domain resource corresponding to the first PUCCH resource in the second time unit, on the subband to which the first PUCCH resource belongs is uplink, flexible, or full duplex. The network device determines, from the plurality of PUCCH resource sets, a PUCCH resource set corresponding to a payload size of a HARQ-ACK codebook as a target resource set, where the HARQ-ACK codebook is generated by the terminal. The network device determines a PUCCH resource in the target PUCCH resource set as a target PUCCH resource. The network device receives the HARQ-ACK codebook on the target PUCCH resource.

Based on the foregoing solution, in a subband full duplex scenario, only a limitation that each PUCCH resource set configured by the network device for the terminal includes at least one first PUCCH resource needs to be set, and behavior of the terminal does not need to be greatly changed. This can avoid a problem that all PUCCH resources in a resource set configured for the terminal are on at least two subbands with different symbol categories, and consequently the HARQ-ACK codebook cannot be sent and received by using these PUCCH resources. An implementation is simple.

According to a sixth aspect, this application provides a communication apparatus, to implement the method in any one of the first aspect to the fifth aspect and the possible implementations of the first aspect to the possible implementations of the fifth aspect. The apparatus includes a corresponding module configured to perform the method. The module included in the apparatus can be implemented by software and/or hardware.

According to a seventh aspect, this application provides a communication apparatus. The communication apparatus includes a processor. The processor is coupled to a memory, and may be configured to execute a computer program in the memory, to implement the method in any one of the first aspect to the fifth aspect and the possible implementations of the first aspect to the possible implementations of the fifth aspect.

Optionally, the communication apparatus further includes the memory.

Optionally, the communication apparatus further includes a communication interface, and the processor is coupled to the communication interface.

According to an eighth aspect, this application provides a chip system. The chip system includes at least one processor, configured to support implementation of the function in any one of the first aspect to the fifth aspect and the possible implementations of the first aspect to the possible implementations of the fifth aspect, for example, receiving or processing data and/or indication information in the foregoing method.

In a possible design, the chip system further includes a memory, the memory is configured to store program instructions and data, and the memory is located inside or outside the processor.

The chip system may include a chip, or may include a chip and another discrete component.

According to a ninth aspect, this application provides a computer-readable storage medium. The computer storage medium stores a computer program (which may also be referred to as code or instructions), and when the computer program is run by a processor, the method in any one of the first aspect to the fifth aspect and the possible implementations of the first aspect to the possible implementations of the fifth aspect is performed.

According to a tenth aspect, this application provides a computer program product. The computer program product includes a computer program (which may also be referred to as code or instructions), and when the computer program is run, the method in any one of the first aspect to the fifth aspect and the possible implementations of the first aspect to the possible implementations of the fifth aspect is performed.

It should be understood that, the sixth aspect to the tenth aspect of this application correspond to the technical solutions of the first aspect to the fifth aspect of this application, and beneficial effects achieved in the aspects and corresponding feasible implementations are similar. Details are not described again.

DESCRIPTION OF EMBODIMENTS

Figure 1:
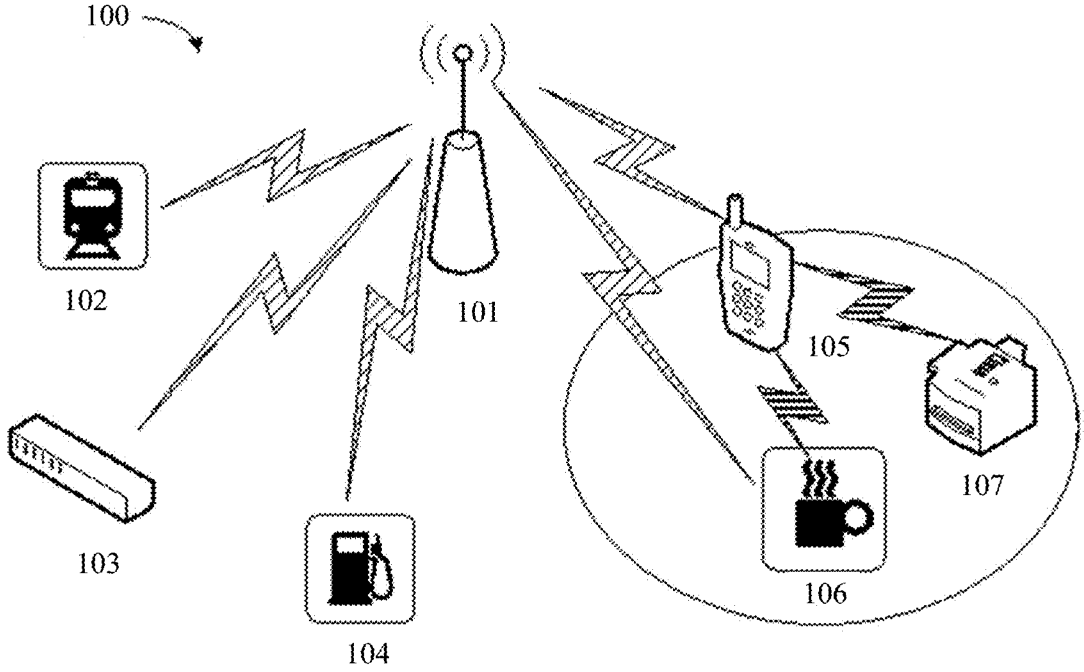
FIG. 1 is a diagram of a communication system applicable to an embodiment of this application.

The following describes technical solutions of this application with reference to accompanying drawings.

For ease of describing the technical solutions in embodiments of this application, the words such as "first" and "second" are used to distinguish between same or similar items whose functions are basically the same in embodiments of this application. For example, a first time-frequency resource and a second time-frequency resource are merely used to distinguish between different time-frequency resources, a first time unit and a second time unit are merely used to distinguish between different time units, first indication information and second indication information are merely used to distinguish between different indication information, and a sequence thereof is not limited. A person skilled in the art may understand that the words such as "first" and "second" do not limit a quantity or an execution order, and the words such as "first" and "second" do not necessarily indicate a specific difference.

In embodiments of this application, "at least one" refers to one or more, and "a plurality of" refers to two or more. The term "and/or" describes an association relationship of associated objects, and indicates that three relationships may exist. For example, A and/or B may indicate the following three cases: Only A exists, both A and B exist, and only B exists. A and B may be singular or plural. The character "/" usually indicates an "or" relationship between the associated objects. "At least one of the following items (pieces)" or a similar expression thereof refers to any combination of these items, including a single item (piece) or any combination of a plurality of items (pieces). For example, at least one of a, b, or c may represent a, b, c, a and b, a and c, b and c, or a, b, and c. Herein, a, b, and c may be singular or plural.

The technical solutions in embodiments of this application may be applied to various communication systems, for example, a 5th generation (5G) mobile communication system or a new radio access technology (NR). The 5G mobile communication system may include non-standalone (NSA) networking and/or standalone (SA) networking.

The technical solutions provided in this application may be further applied to machine type communication (MTC), long term evolution-machine (LTE-M), a device-to-device (D2D) network, a machine-to-machine (M2M) network, an internet of things (IoT) network, or another network. The IoT network may include, for example, an internet of vehicles. Communication modes in an internet of vehicles system are collectively referred to as a vehicle to X (V2X, where X may represent anything) system. For example, V2X may include vehicle to vehicle (V2V) communication, vehicle to infrastructure (V2I) communication, vehicle to pedestrian (V2P) communication, or vehicle to network (V2N) communication.

The technical solutions provided in this application may be further applied to a future communication system, for example, a 6th generation mobile communication system. This is not limited in this application.

In embodiments of this application, a network device may be any device having receiving and sending functions or a chip that can be disposed in the network device. The network device includes but is not limited to a base station (for example, a node B (NodeB) or an evolved NodeB (eNB)), a radio network controller (RNC), a base station controller (BSC), a base transceiver station (BTS), a home base station (for example, a home evolved NodeB or a home NodeB, HNB), a baseband unit (BBU), an access point (AP) in a radio network system, a radio relay node (RRN), a radio backhaul node, a transmission point (TP), a transmission and reception point (TRP), or the like, or may be a gNB or a transmission point (TRP or TP) in a 5G system, for example, an NR system, or one antenna panel or a group of antenna panels (including a plurality of antenna panels) of a base station in a 5G system, or may be a network node, for example, a BBU or a distributed unit (DU), that forms a gNB or a transmission point. It may be understood that all or some functions of the network device in this application may alternatively be implemented by using a software function running on hardware, or may be implemented by using an instantiated virtualization function on a platform (for example, a cloud platform).

In some deployments, the gNB may include a central unit (centralized unit, CU) and a DU. The gNB may further include an active antenna unit (AAU). The CU implements some functions of the gNB, and the DU implements some functions of the gNB. For example, the CU may be responsible for processing a non-real-time protocol and service, for example, may implement functions of a radio resource control (RRC) layer, a service data adaptation protocol (SDAP) layer, and/or a packet data convergence protocol (PDCP) layer. The DU may be responsible for processing a physical layer protocol and a real-time service. For example, the DU may implement functions of a radio link control (RLC) layer, a media access control (MAC) layer, and a physical (PHY) layer. One DU may be connected to only one CU or a plurality of CUs, and one CU may be connected to a plurality of DUs. The CU and the DU may communicate with each other through an F1 interface. The AAU may implement some physical layer processing functions, radio frequency processing, and a function related to an active antenna. Information at the RRC layer is eventually submitted to the PHY layer and is converted into information at the PHY layer, or is converted from information at the PHY layer. Therefore, in this architecture, higher layer signaling such as RRC layer signaling may also be considered as being sent by the DU or sent by the DU and the AAU.

It may be understood that the network device may be a device including one or more of a CU node, a DU node, and an AAU node. In addition, the CU may be classified into a network device in an access network (RAN), or the CU may be classified into a network device in a core network (CN). This is not limited in this application.

The network device provides a service for a cell, and a terminal communicates with the cell through a transmission resource (for example, a frequency domain resource or a spectrum resource) allocated by the network device. The cell may belong to a macro base station (for example, a macro eNB or a macro gNB), or may belong to a base station corresponding to a small cell. The small cell herein may include a metro cell, a micro cell, a pico cell, a femto cell, or the like. These small cells have characteristics such as small coverage and low transmit power, and are applicable to providing a high-rate data transmission service.

The base station may be a macro base station, a micro base station, a pico base station, a small cell, a relay station, a balloon station, or the like. If there are a plurality of network devices in a communication system, the plurality of network devices may be base stations of a same type, or may be base stations of different types. The plurality of base stations may support networks of a same technology mentioned above, or may support networks of different technologies mentioned above.

In embodiments of this application, the terminal may also be referred to as user equipment (UE), an access terminal, a subscriber unit, a subscriber station, a mobile station, a remote station, a remote terminal, a mobile device, a user terminal, a terminal, a wireless communication device, a user agent, or a user apparatus. The terminal may be fixed or mobile.

The terminal may communicate with different network devices. The terminal may communicate with a plurality of base stations using different technologies. For example, the terminal may communicate with a base station supporting an LTE network, or may communicate with a base station supporting a 5G network, or may support a dual connection to a base station in an LTE network and a base station in a 5G network.

In embodiments of this application, the terminal may be a device having receiving and sending functions. The terminal may be deployed on land, and include an indoor or outdoor device, a handheld device, a wearable device, or an in-vehicle device. Alternatively, the terminal may be deployed on a water surface (for example, on a ship). Alternatively, the terminal may be deployed in the air (for example, on an airplane, a balloon, or a satellite). Currently, some examples of the terminal may be a mobile phone, a tablet computer (pad), a computer (for example, a notebook computer or a palmtop computer) with wireless sending and receiving functions, a mobile internet device (MID), a virtual reality (VR) device, an augmented reality (AR) device, a wireless terminal in industrial control, a wireless terminal in self-driving, a wireless terminal in telemedicine (remote medical), a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device with a wireless communication function, a computing device, another processing device connected to a wireless modem, a vehicle-mounted device, a wearable device, a terminal in a 5G network, or a terminal in a future evolved public land mobile network (PLMN).

The wearable device may also be referred to as a wearable intelligent device or the like, and is a general term of wearable devices that are intelligently designed and developed for daily wear by using a wearable technology, for example, glasses, gloves, watches, clothes, and shoes. The wearable device is a portable device that is directly worn on a body or integrated into clothes or an accessory of a user. The wearable device is not only a hardware device, but also implements a powerful function through software support, data exchange, and cloud interaction. Generalized wearable intelligent devices include full-featured and large-sized devices that can implement complete or partial functions without depending on a smartphone, for example, a smartwatch or smart glasses, and devices that focus on only one type of application function and need to work with another device such as a smartphone, for example, various smart bands or smart jewelry for monitoring physical signs.

In addition, the terminal may alternatively be a terminal in an internet of things (IoT) system. IoT is an important part of future information technology development. A main technical feature of IoT is that an article is connected to a network by using a communication technology, to implement an intelligent network of man-machine interconnection and interconnection between things. The IoT technology can implement massive connections, deep coverage, and terminal power saving by using, for example, a narrow band (NB) technology.

In addition, the terminal may alternatively include a sensor such as an intelligent printer, a train detector, or a gas station. Main functions include collecting data (some terminals), receiving control information and downlink data from a network device, sending an electromagnetic wave, and transmitting uplink data to the network device.

It should be understood that a specific form of the network device and a specific form of the terminal are not limited in this application.

For ease of understanding of embodiments of this application, a communication system applicable to a communication method provided in embodiments of this application is first described in detail with reference to FIG. 1. FIG. 1 is a diagram of a communication system 100 applicable to a method according to an embodiment of this application. As shown in the figure, the communication system 100 may include at least one network device, for example, a network device 101 in the 5G system shown in FIG. 1. The communication system 100 may further include at least one terminal, for example, terminals 102 to 107 shown in FIG. 1. The terminals 102 to 107 may be mobile or fixed. The network device 101 may communicate with one or more of the terminals 102 to 107 through a radio link. Each network device may provide communication coverage for a geographical area, and may communicate with a terminal located in the coverage area. For example, the network device may send configuration information to the terminal, and the terminal may send uplink data to the network device based on the configuration information. For another example, the network device may send downlink data to the terminal. Therefore, the network device 101 and the terminals 102 to 107 in FIG. 1 form a communication system.

Optionally, the terminals may directly communicate with each other. For example, direct communication between the terminals may be implemented by using D2D technology. As shown in the figure, direct communication may be performed between the terminals 105 and 106 and between the terminals 105 and 107 by using the D2D technology. The terminal 106 and the terminal 107 may separately or simultaneously communicate with the terminal 105. The terminals 105 to 107 may separately communicate with the network device 101. For example, the terminal may directly communicate with the network device 101. For example, the terminal 105 and the terminal 106 in the figure may directly communicate with the network device 101. Alternatively, the terminal may indirectly communicate with the network device 101. For example, the terminal 107 in the figure communicates with the network device 101 through the terminal 106.

It should be understood that, FIG. 1 shows an example of one network device, a plurality of terminals, and communication links between the communication devices. Optionally, the communication system 100 may include a plurality of network devices, and coverage of each network device may include another quantity of terminals, for example, more or fewer terminals. This is not limited in this application.

A plurality of antennas may be configured for the foregoing communication devices, for example, the network device 101 and the terminals 102 to 107 in FIG. 1. The plurality of antennas may include at least one transmit antenna configured to send a signal and at least one receive antenna configured to receive a signal. In addition, each communication device further additionally includes a transmitter chain and a receiver chain. A person of ordinary skill in the art may understand that both the transmitter chain and the receiver chain may include a plurality of components (for example, a processor, a modulator, a multiplexer, a demodulator, a demultiplexer, or an antenna) related to signal sending and receiving. Therefore, the network device and the terminal may communicate with each other by using a multi-antenna technology.

Optionally, the wireless communication system 100 may further include another network entity such as a network controller or a mobility management entity. This is not limited in embodiments of this application. For ease of understanding of embodiments of this application, the following briefly describes some terms or words in this application.

1. Time unit: may be a subframe, or may be a slot, or may be a radio frame, a mini-slot, a sub-slot, a plurality of aggregated slots, a plurality of aggregated subframes, or the like, or may even be a transmission time interval (TTI). This is not specially limited in embodiments of this application.
2. Symbol: is a minimum unit of a time domain resource. A time length of one symbol is not limited in embodiments of this application. A length of one symbol may vary for different subcarrier spacings.

A symbol category may include uplink, downlink, flexible, or full duplex. This is an example rather than a limitation. The symbol category may also be understood as a direction of a symbol. When a direction of a symbol is uplink, it indicates that an uplink signal may be transmitted on the symbol. The uplink signal is a signal whose transmission direction is uplink, for example, may be a signal sent by a terminal to a network device. When a direction of a symbol is downlink, it indicates that a downlink signal may be transmitted on the symbol. The downlink signal is a signal whose transmission direction is downlink, for example, may be a signal sent by a network device to a terminal. When a direction of a symbol is flexible, it indicates that a transmission direction of a signal corresponding to the symbol is not determined. In this case, with reference to a related definition or configuration, the flexible symbol may be used for uplink signal transmission, or may be used for downlink signal transmission. This is not limited in embodiments of this application. When a direction of a symbol is full duplex, it may be understood that downlink signal transmission may be performed on the symbol, and uplink signal transmission may be performed on the symbol.

One slot may include 14 symbols, or one slot may include 12 symbols. An example in which one slot includes 14 symbols is used in this application. However, a quantity of symbols included in one slot is not limited in this application.

3. Carrier (CC): indicates a segment of consecutive frequency domain resources, and may correspond to a cell configuration.
4. Subband: In a design, a frequency domain resource occupied by one subband may be less than a frequency domain resource occupied by one CC, frequency domain resources of one subband are consecutive, and frequency domain resources of different subbands do not overlap. A plurality of subbands may be consecutive or inconsecutive in frequency domain. For example, in a design in which a plurality of subbands are inconsecutive, there may be a guard interval between every two subbands in the plurality of subbands. Similarly, in a design in which a plurality of subbands are consecutive in frequency domain, there may be no guard interval between every two subbands in the plurality of subbands.
5. HARQ-ACK codebook: may be understood as a HARQ-ACK codebook generated based on ACK or negative acknowledgment (NACK) information that needs to be fed back in one or more time units.

HARQ-ACK codebooks may be classified into a dynamic codebook and a semi-persistent codebook.

The semi-persistent codebook may be a HARQ-ACK codebook generated in a semi-persistent manner. In a semi-persistent codebook mode, a payload size of a codebook changes semi-persistently, that is, remains unchanged in a period of time. The semi-persistent codebook has relatively high reliability. The semi-persistent codebook is determined based on a candidate PDSCH reception occasion set, a maximum quantity of codewords, and another HARQ configuration. A codebook size does not dynamically change with an actual data scheduling status. For example, a quantity of bits that need to be fed back in one time unit may be determined based on whether a terminal supports transmission of a plurality of PDSCHs in one slot, a quantity of serving cells configured by using RRC layer signaling, a HARQ spatial bundling parameter (harq-ACK-SpatialBundlingPUCCH) of each serving cell configured by using RRC layer signaling, a PDSCH-code block group (CBG) configuration parameter (PDSCH-CodeBlockGroupTransmission) of each serving cell configured by using RRC layer signaling, a maximum codeword parameter supported by each serving cell configured by using RRC layer signaling, and the like, and then a semi-persistent HARQ-ACK codebook is determined.

The dynamic codebook is determined based on information such as a count downlink assignment index (C-DAI) and a total downlink assignment index (T-DAI) in time domain in downlink control information (DCI), and another HARQ configuration. A codebook size dynamically changes with an actual data scheduling status.

6. Higher layer signaling: may be signaling sent from a higher-layer protocol layer. The higher-layer protocol layer is a protocol layer above a physical layer. The higher-layer protocol layer may include at least one of the following protocol layers: a MAC layer, an RLC layer, a PDCP layer, an RRC layer, and a non-access stratum (NAS).

In 5G NR, a network device may implement configuration of a symbol category on one CC in the following two manners: higher layer configuration/RRC layer signaling configuration and a downlink control information 2-0 (downlink control indicator 2-0, DCI 2-0) dynamic indicator. The DCI 2-0 dynamic indicator is also referred to as a slot format indicator (SFI).

In a higher layer configuration solution, the network device may notify a terminal device by using RRC layer signaling, to implement configuration of a symbol category in a cycle. This solution may also be referred to as an RRC-configured slot format. Configuration parameters in the higher layer configuration solution may be further classified into: a cell-level configuration parameter, such as TDD common configuration (TDD-ConfigCommon), and a terminal-level configuration parameter, such as TDD dedicated configuration (TDD-ConfigDedicated).

TDD-ConfigCommon includes the following information: a cycle of TDD-ConfigCommon, a quantity of downlink slots in the cycle, a quantity of uplink slots in the cycle, a quantity of downlink symbols in the cycle, a quantity of uplink symbols in the cycle, and the like. TDD-ConfigCommon supports both single-cycle configuration and dual-cycle configuration.

TDD-ConfigDedicated is a terminal-level configuration parameter, and may be configured separately for each terminal. Each terminal may modify a direction of a flexible symbol in TDD-ConfigCommon. TDD-ConfigDedicated includes the following information: an identifier (identity, ID) of a slot, a quantity of uplink symbols in the slot, a quantity of downlink symbols in the slot, and the like.

In the higher layer configuration solution, there may be only a cell-level configuration parameter, or there may be both a cell-level configuration parameter and a terminal-level configuration parameter. To avoid misunderstanding subsequently, the higher layer configuration solution may be referred to as RRC slot format configuration in embodiments of this application.

The following describes a communication method and a communication apparatus provided in this application with reference to the accompanying drawings.

In the foregoing communication system, a time-frequency resource configured by the network device for the terminal is configured for an entire CC. In other words, a symbol category of a symbol is configured for an entire CC. As shown in (a) in FIG. 2, symbol categories of a slot 1 and a slot 2 on a carrier 1 are configured for the entire CC. Symbol categories of 14 symbols included in the slot 1 on the carrier 1 are all D, and symbol categories of 14 symbols included in the slot 2 on the carrier 1 include seven Ds, five Fs, and two Us, as shown in (a) in FIG. 2.

To improve uplink coverage, an SBFD solution is proposed. Based on the SBFD solution, one CC may include a plurality of non-overlapping subbands that are consecutive in frequency domain, and symbols in one or more time units have different symbol categories on the plurality of subbands. For example, a same symbol is configured as an uplink symbol on some subbands, and is configured as a downlink symbol on some other subbands. Symbol categories of a slot 3 and a slot 4 shown in (b) in FIG. 2 on a carrier 2 are configured for subbands. Symbol categories of one symbol may be different on different subbands in a same CC. In other words, simultaneous receiving and sending may be implemented on one CC.

In an SBFD scenario, one CC includes a plurality of subbands. For ease of differentiation and description, the following definitions are first specified.

Full-band D slot: One CC is divided into a plurality of subbands, and on the CC, symbol categories of all symbols of one slot on the plurality of subbands are D. In this case, the slot may be referred to as a full-band D slot.

Full-band U slot: One CC is divided into a plurality of subbands, and on the CC, symbol categories of all symbols of one slot on the plurality of subbands are U. In this case, the slot may be referred to as a full-band U slot.

Full-band FD slot: One CC is divided into a plurality of subbands, and on the CC, symbol categories of all symbols of one slot on the plurality of subbands are FD. In this case, the slot may be referred to as a full-band FD slot.

Full-band F slot: One CC is divided into a plurality of subbands, and on the CC, symbol categories of all symbols of one slot on the plurality of subbands are F. In this case, the slot may be referred to as a full-band F slot.

Full-band D and FD slot: One CC is divided into a plurality of subbands, symbol categories of one slot on the plurality of subbands include only D and FD on the CC, and the slot is neither a full-band D slot nor a full-band FD slot. In this case, the slot may be referred to as a full-band D and FD slot.

Full-band U and FD slot: One CC is divided into a plurality of subbands, symbol categories of one slot on the plurality of subbands include only U and FD on the CC, and the slot is neither a full-band U slot nor a full-band FD slot. In this case, the slot may be referred to as a full-band U and FD slot.

Subband D slot/Subband U slot: One CC is divided into a plurality of subbands, symbol categories of one or more symbols of one slot on the plurality of subbands are different on the CC, and the slot is not a full-band D and FD slot and is not a full-band U and FD slot.

In the full-band D slot, all symbols corresponding to different subbands may be used to transmit a downlink signal, and all symbols corresponding to different subbands cannot be used to transmit an uplink signal.

In the full-band U slot, all symbols corresponding to different subbands may be used to transmit an uplink signal, and all symbols corresponding to different subbands cannot be used to transmit a downlink signal.

In the full-band FD slot, all symbols corresponding to different subbands may be used to simultaneously transmit an uplink signal and a downlink signal.

In the full-band F slot, all symbols corresponding to different subbands may be used to transmit an uplink signal or a downlink signal.

In the full-band D and FD slot, all symbols corresponding to different subbands may be used to transmit a downlink signal, and some symbols corresponding to some subbands may be used to simultaneously transmit an uplink signal and a downlink signal.

In the full-band U and FD slot, all symbols corresponding to different subbands may be used to transmit an uplink signal, and some symbols corresponding to some subbands may be used to simultaneously transmit an uplink signal and a downlink signal.

Subband D slot/Subband U slot: It is determined, based on symbol categories corresponding to different subbands, that a symbol can be used to transmit an uplink signal and/or a downlink signal.

Similarly, a full-band D time unit, a full-band U time unit, a full-band FD time unit, a full-band F time unit, a full-band D and FD time unit, a full-band U and FD time unit, a subband D time unit, a subband U time unit, and the like may be defined. In embodiments of this application, an example in which a time unit is a slot is used.

Figure 2:
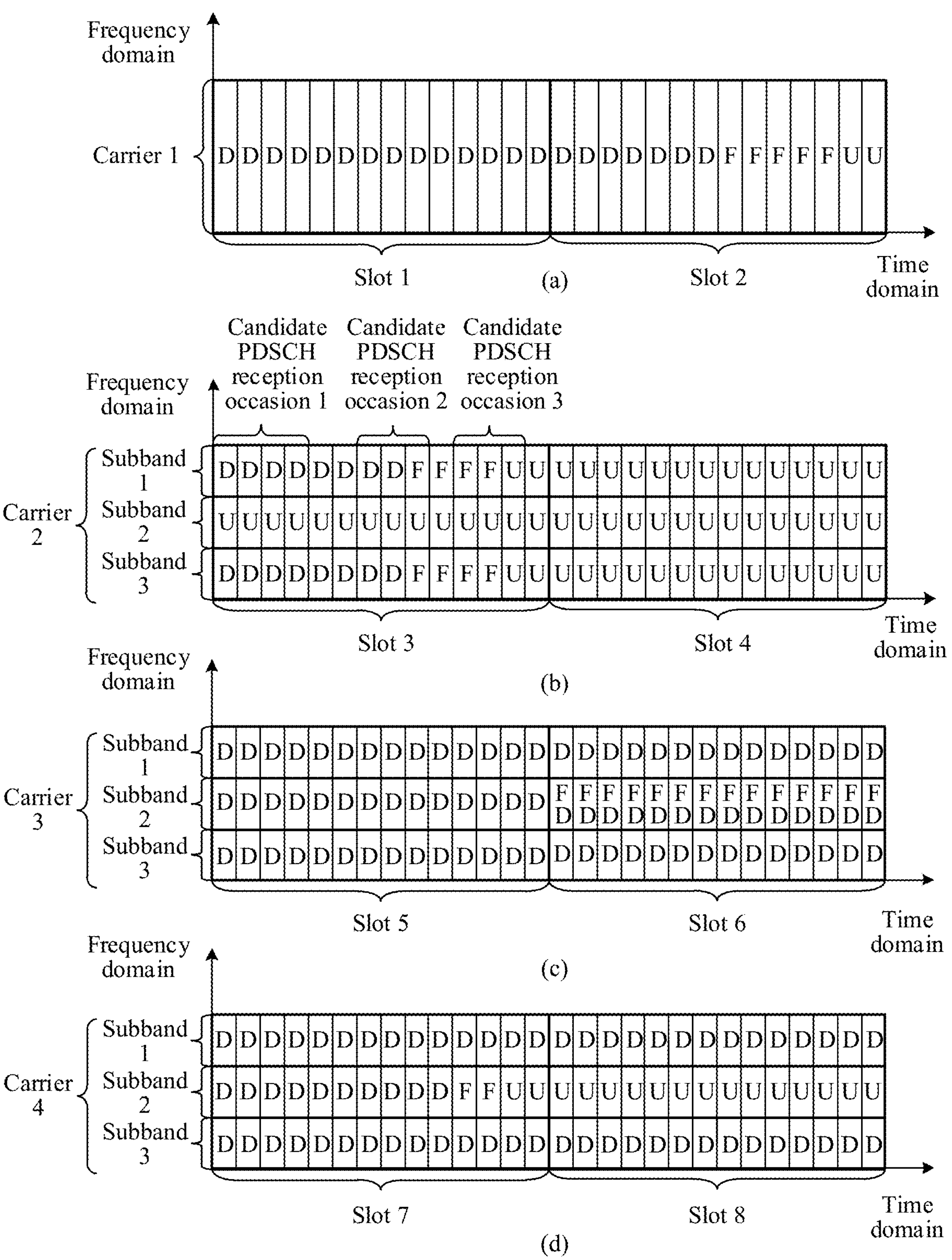
FIG. 2 is a diagram of comparison between different carriers.

As shown in (b) in FIG. 2, categories of all symbols in a slot 4 on all subbands of a carrier 2 are U. In this case, the slot 4 may be referred to as a full-band U slot. As shown in (c) in FIG. 2, categories of all symbols in a slot 5 on all subbands of a carrier 3 are D. In this case, the slot 5 may be referred to as a full-band D slot. Categories of all symbols in a slot 6 on all the subbands of the carrier 3 include only D and FD. In this case, the slot 6 may be referred to as a full-band D and FD slot. A slot 3 shown in (b) in FIG. 2 and a slot 7 and a slot 8 shown in (d) in FIG. 2 each may be referred to as a subband D/subband U slot.

In the SBFD solution, in some possible configurations, a slot is a full-band D and FD slot, a full-band U and FD slot, or a subband D/subband U slot. In this case, how to send and receive a HARQ-ACK codebook is to be resolved.

In addition, for the case shown in (a) in FIG. 2, the terminal may determine a target candidate PDSCH reception occasion from candidate PDSCH reception occasions in a slot. Determining of the target candidate PDSCH reception occasion is related to a slot format configured by using RRC layer signaling. When a symbol category, in the RRC-configured slot format, of at least one symbol in symbols on which a candidate PDSCH reception occasion is located is U, the candidate PDSCH reception occasion is not the target candidate PDSCH reception occasion. The terminal determines, based on the target candidate PDSCH reception occasion in a manner in section 9.1.2 in the technical specification (TS) 38.213 release G60, a quantity of bits of a HARQ-ACK fed back in one time unit, and then determines a HARQ-ACK codebook based on an actually received PDSCH.

However, when the SBFD solution is used, if the target candidate PDSCH reception occasion is determined according to this method, some resources may be idle. For example, in a subband D slot, if a symbol category, of a symbol on which a candidate PDSCH reception occasion is located, in an RRC-configured slot format on a first subband is D, F, or FD, and a symbol category, of the symbol on which the candidate PDSCH reception occasion is located, in an RRC-configured slot format on a second subband is U, the candidate PDSCH reception occasion may not be selected as the target candidate PDSCH reception occasion. In other words, the network device may not perform downlink transmission on the candidate PDSCH reception occasion. Actually, when the second subband is not considered, the network device may perform downlink transmission on the candidate PDSCH reception occasion on the first subband. Therefore, resources are not properly utilized, and resource utilization is to be improved.

Therefore, embodiments of this application provide a communication method. When an SBFD solution is used, a target candidate PDSCH reception occasion is defined, so that a terminal and a network device can determine the target candidate PDSCH reception occasion based on a same rule, to implement normal transmission of a HARQ-ACK. In addition, because each symbol in the target candidate PDSCH reception occasion satisfies that a symbol category on at least one subband is downlink, flexible, or full duplex, the network device can perform uplink and downlink transmission on a same CC as much as possible, to improve resource utilization.

Figure 3:
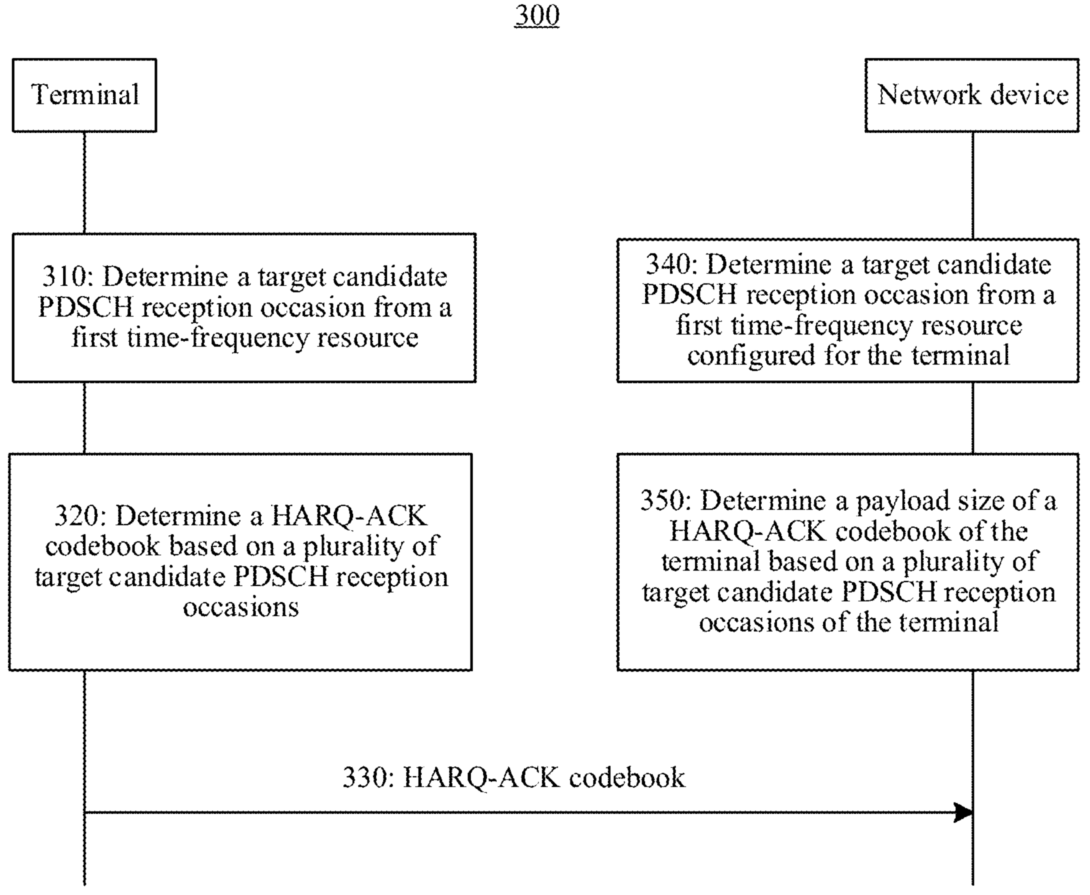
FIG. 3 is a schematic flowchart of a communication method according to an embodiment of this application.

FIG. 3 is a schematic flowchart of a communication method according to an embodiment of this application.

In step 310, a terminal determines a target candidate PDSCH reception occasion from a first time-frequency resource.

In this embodiment of this application, the first time-frequency resource corresponds to one time unit in time domain. For ease of differentiation and description, in this application, the time unit corresponding to the first time-frequency resource is denoted as a first time unit. The first time unit includes one or more symbols. A frequency domain resource corresponding to the first time-frequency resource includes a plurality of subbands, the plurality of subbands are consecutive non-overlapping frequency domain resources on the frequency domain resource corresponding to the first time-frequency resource, and the plurality of subbands are on one carrier. In this embodiment of this application, the one or more symbols in the first time unit have different symbol categories on the plurality of subbands. In other words, the first time-frequency resource is applicable to an SBFD solution.

In this embodiment of this application, the plurality of subbands may be subbands included in a bandwidth part (BWP) activated by the terminal.

For example, a time-frequency resource corresponding to a slot 3 on a carrier 2 shown in (b) in FIG. 2, a time-frequency resource corresponding to a slot 6 on a carrier 3 shown in (c) in FIG. 2, and a time-frequency resource corresponding to a slot 7 on a carrier 4 and a time-frequency resource corresponding to a slot 8 on the carrier 4 shown in (d) in FIG. 2 are all examples of the first time-frequency resource. The slot 3, the slot 6, the slot 7, and the slot 8 are all examples of the first time unit.

It should be noted that a time-frequency resource configured by a network device for the terminal may include one or more time units in time domain, and the terminal may determine the first time-frequency resource based on the foregoing characteristics of the first time-frequency resource in time domain and frequency domain. If division is performed by using the first time unit as a granularity, and a resource that satisfies the foregoing characteristics and that corresponds to one first time unit in the time-frequency resource configured by the network device for the terminal is denoted as one first time resource, the time-frequency resource configured by the network device for the terminal may include one or more first time-frequency resources.

In this embodiment of this application, the target candidate PDSCH reception occasion includes at least one symbol, and each symbol included in the target candidate PDSCH reception occasion satisfies: A symbol category on at least one of the plurality of subbands is D, flexible F, or FD, or a symbol category on a first subband in the plurality of subbands is downlink, flexible, or full duplex. The first subband is a specific subband in the plurality of subbands. In other words, when the target candidate PDSCH reception occasion is determined, a symbol category on only the specific subband needs to be considered. That a symbol category is full duplex (FD) may be understood as that uplink transmission and downlink transmission may be simultaneously performed in one symbol on one subband.

For example, a symbol category of each symbol included in a candidate PDSCH reception occasion 1 shown in (b) in FIG. 2 on at least one of the three subbands is D. Therefore, the candidate PDSCH reception occasion 1 is a target candidate PDSCH reception occasion. A symbol category of each symbol included in a candidate PDSCH reception occasion 2 on at least one of the three subbands is D or F.

Therefore, the candidate PDSCH reception occasion 2 is a target candidate PDSCH reception occasion. Symbol categories of a last symbol of a candidate PDSCH reception occasion 3 on the three subbands are all U. Therefore, the candidate PDSCH reception occasion 3 does not satisfy a characteristic of a target candidate PDSCH reception occasion. Therefore, the candidate PDSCH reception occasion 3 is not a target candidate PDSCH reception occasion.

For another example, it is assumed that a subband 2 of a carrier 2 shown in (b) in FIG. 2 is the first subband. A symbol category of each symbol included in a candidate PDSCH reception occasion 1 and a candidate PDSCH reception occasion 2 on the first subband is D or F. Therefore, the candidate PDSCH reception occasion 1 and the candidate PDSCH reception occasion 2 are target candidate PDSCH reception occasions. A symbol category of a last symbol of a candidate PDSCH reception occasion 3 on the first subband is U. Therefore, the candidate PDSCH reception occasion 3 does not satisfy a characteristic of a target candidate PDSCH reception occasion. Therefore, the candidate PDSCH reception occasion 3 is not a target candidate PDSCH reception occasion.

The following provides examples of several possible designs of the target candidate PDSCH reception occasion.

Optionally, the first subband is a subband with a highest priority in the plurality of subbands.

In a use scenario of the SBFD solution, different priorities may be defined for a plurality of subbands included in one CC. Priorities of different subbands may be configured by a network device for the terminal, or may be predefined. This is not limited in this application.

The first subband may be a subband with a highest priority in a plurality of subbands included in one CC. When the target candidate PDSCH reception candidate occasion is determined, only whether a symbol category of each symbol included in a candidate PDSCH reception occasion on the first subband is downlink, flexible, or full duplex may be considered. If this characteristic is satisfied, the candidate PDSCH reception occasion is the target candidate PDSCH reception occasion.

In this way, different priorities are defined for the subbands, so that resources in subbands with different priorities can be properly utilized. Only whether a symbol category of each symbol included in a candidate PDSCH reception occasion in a subband with a highest priority is downlink, flexible, or full duplex is considered, so that utilization of a resource in a subband with a high priority can be ensured.

Optionally, the first subband is a subband specified by a network device in the plurality of subbands.

The network device may specify that when determining the target candidate PDSCH reception candidate occasion, the terminal may consider only whether a symbol category of each symbol included in a candidate PDSCH reception occasion on a specific subband is downlink, flexible, or full duplex.

In a possible implementation, the network device directly indicates an ID of a subband to the terminal, and the terminal may determine, based on the ID of the subband indicated by the network device, that the subband corresponding to the ID is the first subband. When the target candidate PDSCH reception candidate occasion is determined, only whether a symbol category of each symbol included in a candidate PDSCH reception occasion on the subband specified by the network device is downlink, flexible, or full duplex may be considered. If this characteristic is satisfied, the candidate PDSCH reception occasion is the target candidate PDSCH reception occasion.

In another possible implementation, the terminal may implicitly determine, based on other configuration information configured by the network device for the terminal, which subband is the first subband. For example, when a slot format is configured in a cell by using RRC layer signaling, considering that both a legacy terminal and a new terminal exist in the cell, when the slot format is configured by using the RRC layer signaling, a slot format on a CC may be first configured. This may be referred to as configuration of a CC-level slot format. The CC-level slot format may be identified and used by the legacy terminal. In addition, a slot format of each subband may be further configured by using RRC layer signaling. This may be referred to as configuration of a subband-level slot format. The subband-level slot format may be identified and used by the new terminal. In the subband-level slot format, a slot format of a subband is the same as the CC-level slot format. On a same symbol, a symbol category on the subband is the same as a symbol category configured by the CC-level slot format. The slot format configuration of the subband may be referred to as a legacy configuration. In this case, the terminal may determine a subband using the legacy configuration as the first subband.

Therefore, the terminal does not need to perform additional calculation or determining, and needs only to determine the first subband based on indication information of the network device, and then determine the target candidate PDSCH reception occasion based on the foregoing target candidate PDSCH determining process. This can reduce power consumption of the terminal to some extent.

For ease of understanding and description, the following uses a slot as an example of the first time unit to describe in detail a process in which the terminal determines the first time-frequency resource from the time-frequency resource configured by the network device and then determines the target candidate PDSCH reception occasion.

First, the terminal may first determine the first time-frequency resource from the time-frequency resource configured by the network device, then determine a candidate PDSCH reception occasion for each first time-frequency resource, and determine the target candidate PDSCH reception occasion from the candidate PDSCH reception occasion.

In an implementation of determining a reception time unit of a PDSCH, the network device may configure the time-frequency resource for the terminal by using DCI. The network device may determine, by using a value m (m is a binary number) of a first field in the DCI and a set K1, an uplink time unit for transmitting a HARQ-ACK codebook. The uplink time unit may be, for example, a full-band U slot, or may be a subband U slot, a full-band FD slot, a full-band F slot, a full-band D and FD slot, or a full-band U and FD slot. For ease of differentiation and description, a slot in which the terminal transmits the HARQ-ACK codebook is denoted as a feedback slot.

For example, the value m of the first field may indicate a value $k_m$ in K1. For example, the set K1 is {1, 2, 3, 4, 5, 6, 7, 8}. In this set, "1" may be denoted as a $0^{th}$ number, "2" may be denoted as a $1^{st}$ number, and by analogy, "8" may be denoted as a $7^{th}$ number. When the value m of the first field in the DCI delivered by the network device to the terminal device is "001", it indicates that a value of $k_m$ is the $1^{st}$ number in the set K1, that is, $k_m=2$. A slot in which the terminal receives downlink data and a slot in which the terminal feeds back an ACK/NACK to a base station satisfy a timing relationship of $n+k_m$, where n may represent the slot in which the terminal receives the downlink data, and $k_m$ may represent a slot different between the slot of receiving the downlink data and the slot of feeding back the corresponding ACK/NACK, that is, the slot of feeding back the ACK/NACK is a slot n+$k_m$.

In another implementation of determining a reception time unit of a PDSCH, the network device may configure, for the terminal by using RRC layer signaling, an uplink time unit for transmitting a HARQ-ACK codebook, that is, determine a HARQ-ACK feedback slot of the terminal.

In another implementation of determining a reception time unit of a PDSCH, the network device may configure, for the terminal by using MAC control element (MAC CE) signaling, an uplink time unit for transmitting a HARQ-ACK codebook, that is, determine a HARQ-ACK feedback slot of the terminal.

Based on the feedback slot, the terminal may determine, based on a set K1, that the HARQ-ACK codebook is a feedback for a PDSCH received in specific slots before the feedback slot.

For example, the feedback slot is denoted as a slot i, and a slot j in which the terminal may receive a PDSCH and the slot i satisfy a timing relationship of $j=i-k_m$. $k_m$ may represent an offset between the slot of receiving the PDSCH and the feedback slot, and $k_m$ may be any element in the set K1.

A default configuration of K1 is {1, 2, 3, 4, 5, 6, 7, 8}. The terminal may determine, based on the feedback slot, K1, and whether there is BWP switching, a time range in which the PDSCH can be received. For example, K1 may be determined by downlink data to uplink acknowledgment (DL-DataToUL-ACK) in RRC layer signaling, downlink data to uplink acknowledgment in release 16 (r16) (DL-DataToUL-ACK-r16), or downlink data to uplink acknowledgment DCI-1-2 in release 16 (DL-DataToUL-ACK-DCI-1-2-r16), or may be determined according to a default configuration. This embodiment of this application includes but is not limited to this.

It may be understood that when the terminal has a plurality of serving cells, the terminal may determine, in each serving cell, a time range in which a PDSCH can be received. Each time range may include at least one first time unit. It should be understood that, for an implementation in which the terminal determines the time range in which the PDSCH can be received, refer to related descriptions in section 9 of TS 38.213 release G60. Details are not described herein.

Figure 4:
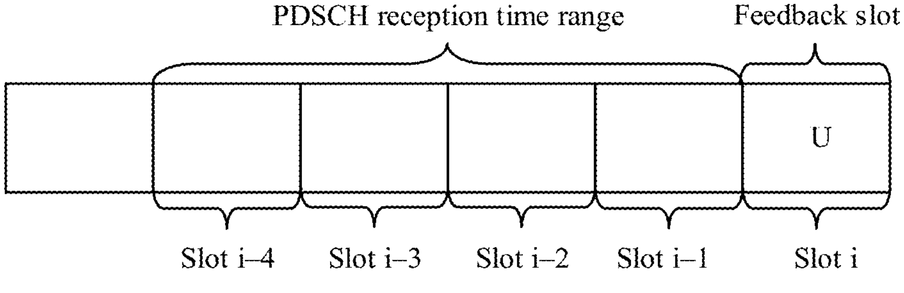
FIG. 4 is a diagram of a PDSCH reception time range and a feedback slot.

As shown in FIG. 4, a slot i is a feedback slot. The network device configures K1={1, 2, 3, 4}. The terminal needs to perform, in the slot i, feedback for a PDSCH received in a slot i−4, a slot i−3, a slot i−2, and a slot i−1. In other words, HARQ-ACK information fed back in the slot i is feedback information for a PDSCH that may be received by the terminal in the slot i−4 to the slot i−1.

Because one slot may include one or more candidate PDSCH reception occasions, the terminal may further determine a candidate PDSCH reception occasion that may be used to transmit a PDSCH in the slot.

The terminal may determine, based on a table configured by an RRC layer or a table predefined in a protocol, a start symbol and a symbol length of a candidate PDSCH reception occasion in a slot, and exclude candidate PDSCH reception occasions, where symbol categories, configured by using an RRC slot format, of one or more symbols in symbols on which the candidate PDSCH reception occasions are located are U on the plurality of subbands. Because the excluded candidate PDSCH reception occasion cannot be used to transmit downlink data, it is unnecessary to send corresponding feedback information.

It should be noted that before determining the first time-frequency resource from the time-frequency resource configured by the network device, the terminal may further exclude a full-band U slot. Because downlink data cannot be transmitted in such a slot, it is unnecessary to send corresponding feedback information to the network device. The terminal may first exclude a slot that is configured as a full-band U slot by using a parameter TDD-ConfigCommon and a parameter TDD-ConfigDedicated. Then, the terminal may determine the target candidate PDSCH reception occasion from candidate PDSCH reception occasions that are not excluded.

In addition, if the time-frequency resource configured by the network device for the terminal includes a full-band D slot, a full-band FD slot, or a full-band F slot in time domain, the terminal may further determine the target candidate PDSCH reception occasion from the full-band D slot, the full-band FD slot, or the full-band F slot according to a currently known technology.

In step 320, the terminal determines a HARQ-ACK codebook based on a plurality of target candidate PDSCH reception occasions.

After determining the target candidate PDSCH reception occasions, the terminal may determine, based on the plurality of target candidate PDSCH reception occasions, a payload size of the HARQ-ACK codebook, that is, a quantity of bits of the HARQ-ACK codebook, and whether a NACK or an ACK needs to be fed back on each bit, to generate the HARQ-ACK codebook.

For example, the terminal may generate the HARQ-ACK codebook based on a target candidate PDSCH reception occasion of each serving cell in each time unit within a time range, whether the terminal supports transmission of a plurality of PDSCHs in one slot, a quantity of serving cells configured by using RRC layer signaling, harq-ACK-SpatialBundlingPUCCH of each serving cell, PDSCH-CodeBlockGroupTransmission of each serving cell, a maximum codeword parameter supported by each serving cell, and the like according to related descriptions in TS 38.213. Details are not described herein.

In step 330, the terminal sends the HARQ-ACK codebook. Correspondingly, the network device receives the HARQ-ACK codebook from the terminal.

After generating the HARQ-ACK codebook, the terminal may send the HARQ-ACK codebook to the network device. Correspondingly, the network device may receive the HARQ-ACK codebook from the terminal.

In a possible implementation, the terminal may determine, based on the payload size of the generated HARQ-ACK codebook, from a plurality of PUCCH resource sets that are configured by the network device for the terminal and that correspond to payload size ranges of a plurality of HARQ-ACK codebooks, a PUCCH resource set that can be used to send the HARQ-ACK codebook. When a quantity of PUCCH resources in the PUCCH resource set is less than or equal to 8, the terminal may determine an index of a PUCCH resource in the PUCCH resource set based on an ACK/NACK resource indicator (ARI) field in DCI of the network device, where a value of the ARI field is equal to an index of a PUCCH resource carrying HARQ-ACK information. When a quantity of PUCCH resources in the PUCCH resource set is greater than 8, the terminal may determine an index of a PUCCH resource in the PUCCH resource set based on an ARI field, a quantity of control channel elements (CCE) included in a control resource set (CORESET) to which a resource carrying a PDCCH belongs, and an index of a first CCE in CCEs in which the PDCCH is located. The index of the PUCCH resource is determined, that is, the PUCCH resource used to send the HARQ-ACK codebook is determined. In this way, the terminal can send the HARQ-ACK codebook to the network device on the PUCCH resource. Correspondingly, the network device may receive the HARQ-ACK codebook from the terminal on the PUCCH resource.

In addition, the network device needs to determine a PUCCH resource for receiving the HARQ-ACK codebook, the PUCCH resource is related to the payload size of the HARQ-ACK codebook, and the payload size of the HARQ-ACK codebook is related to the target candidate PDSCH reception occasion. To correctly parse the HARQ-ACK codebook, the network device also needs to determine the payload size of the HARQ-ACK codebook in advance. Therefore, before receiving the HARQ-ACK codebook, the network device may first perform step 340 to determine the target candidate PDSCH candidate occasion from the first time-frequency resource, and then perform step 350 to determine the payload size of the HARQ-ACK codebook. This can ensure that the HARQ-ACK codebook is correctly received.

It should be understood that an implementation in which the network device determines the target candidate PDSCH candidate occasion from the first time-frequency resource and determines the payload size of the HARQ-ACK codebook is similar to the foregoing implementation in which the terminal determines the target candidate PDSCH candidate occasion from the first time-frequency resource in step 310 and the terminal determines the payload size of the HARQ-ACK codebook based on the plurality of target candidate PDSCH reception occasions in step 320. Details are not described herein again.

It should be further understood that a sequence of performing step 340 and step 350 and step 310 and step 320 is not limited in this application. In other words, before step 330, the terminal has performed step 310 and step 320, and the network device has performed step 340 and step 350.

Based on the foregoing solution, in a use scenario of an SBFD solution, the terminal may determine the target candidate PDSCH reception occasion from a plurality of candidate PDSCH reception occasions based on a definition of the target candidate PDSCH candidate occasion, and then determine the HARQ-ACK codebook. A network device may determine the target candidate PDSCH reception occasion based on a same method, and then determine a payload size of the HARQ-ACK codebook, so that the HARQ-ACK codebook can be correctly received. In this way, normal transmission of the HARQ-ACK codebook is implemented.

In addition, because each symbol in the target candidate PDSCH reception occasion satisfies that a symbol category on at least one subband is downlink, flexible, or full duplex, it means that on a same symbol, there may be at least one subband on which a symbol category is uplink. In this way, the network device can schedule downlink data on a downlink subband of a CC and receive uplink data on an uplink subband of the same CC as much as possible, that is, can perform uplink and downlink transmission on the same CC at the same time. Therefore, resource utilization is improved.

Figure 5:
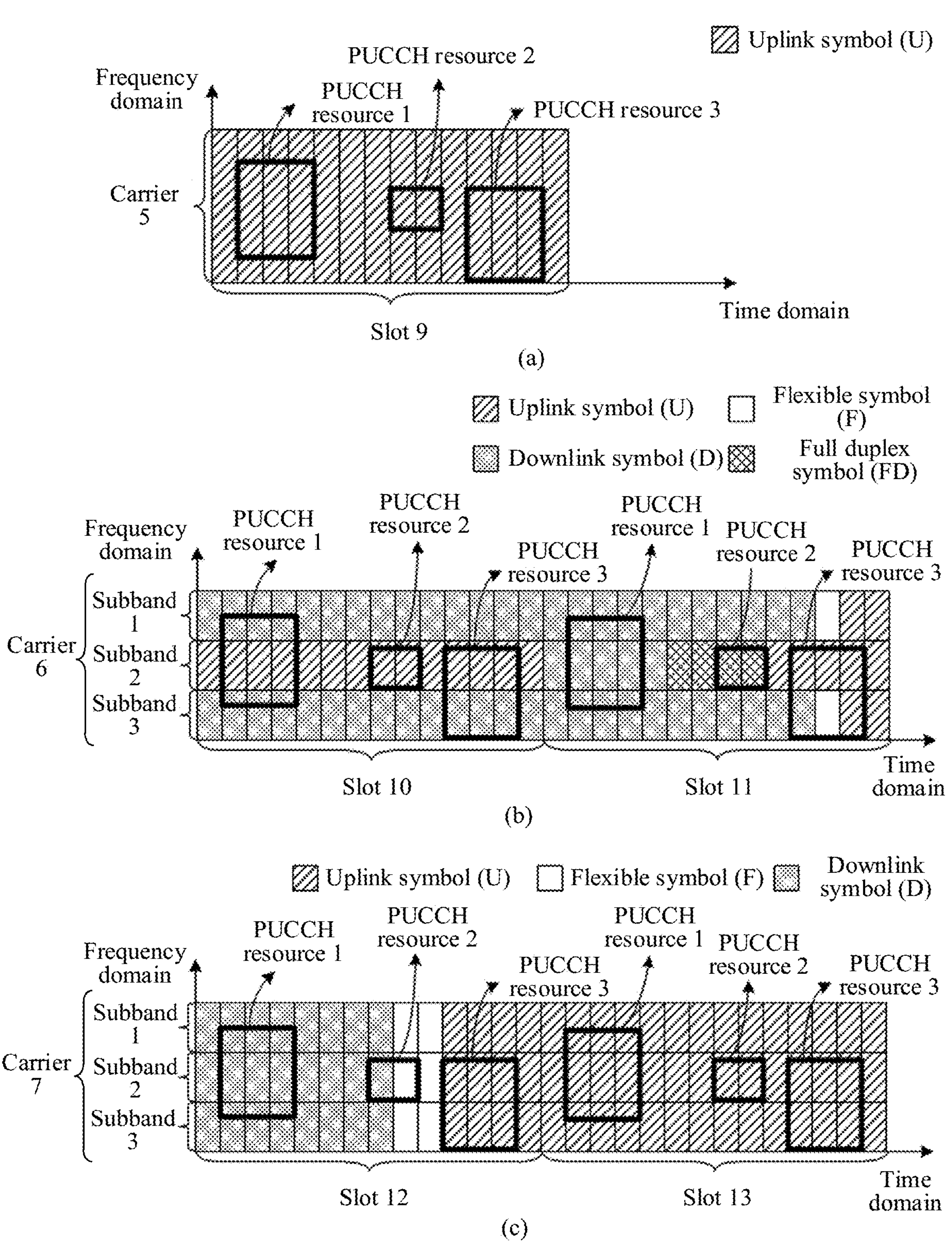
FIG. 5 is a diagram of comparison between resources on different carriers.

As described above, in a known technology, after the terminal generates the HARQ-ACK codebook, for the case shown in (a) in FIG. 5, the terminal and the network device may determine, based on the payload size of the generated HARQ-ACK codebook from the plurality of PUCCH resource sets that are configured by the network device for the terminal and that correspond to the payload size ranges of the plurality of HARQ-ACK codebooks, the PUCCH resource set that can be used to send the HARQ-ACK codebook. In addition, a PUCCH resource is determined from the resource set to send the HARQ-ACK codebook.

However, when the SBFD solution is used, because there is a possibility that the PUCCH resource determined by the terminal crosses subbands, for example, a PUCCH resource 1 and a PUCCH resource 3 in a slot 10 and a PUCCH resource 3 in a slot 11 in (b) in FIG. 5, if the resource used to transmit the HARQ-ACK codebook is determined according to an existing technology, none of the PUCCH resource 1 and the PUCCH resource 3 in the slot 10 and the PUCCH resource 3 in the slot 11 shown in (b) in FIG. 5 can be used to transmit the HARQ-ACK codebook. Symbol categories of time domain resources of a PUCCH resource 1 in the slot 11 shown in (b) in FIG. 5 and a PUCCH resource 1 and a PUCCH resource 2 in a slot 12 shown in (c) in FIG. 5 include D, and the resources cannot be used to transmit the HARQ-ACK codebook either. This affects sending and receiving of the HARQ-ACK codebook, and causes some resources to be idle, resulting in low resource utilization. If all PUCCH resources cross subbands, and symbol categories of time domain resources of all the PUCCH resources include D, there may be no resource used to transmit the HARQ-ACK codebook, and transmission reliability is reduced.

Therefore, embodiments of this application provide a communication method. When the SBFD solution is used, a PUCCH resource set configured by a network device for a terminal is designed, to set a limitation that every two PUCCH resource sets in a plurality of PUCCH resource sets configured by the network device for the terminal correspond to a payload size range of one HARQ-ACK codebook, and at least one of the two PUCCH resource sets includes at least one PUCCH resource that does not cross subbands, so as to properly determine a PUCCH resource for transmission of a HARQ-ACK codebook. On one hand, normal transmission of the HARQ-ACK codebook can be ensured, and transmission reliability can be ensured. On the other hand, resource utilization can be improved.

Figure 6:
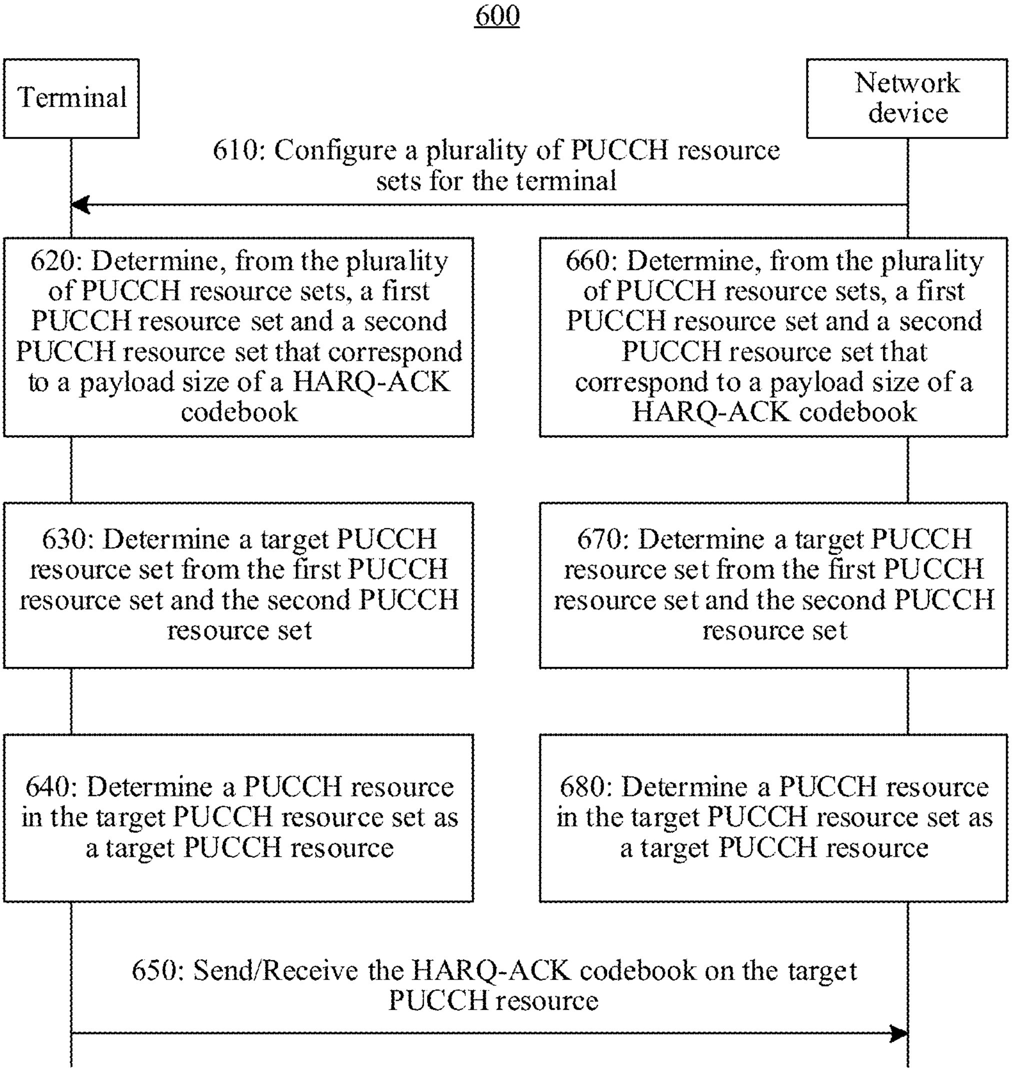
FIG. 6 is a schematic flowchart of another communication method according to an embodiment of this application.
Figure 8:
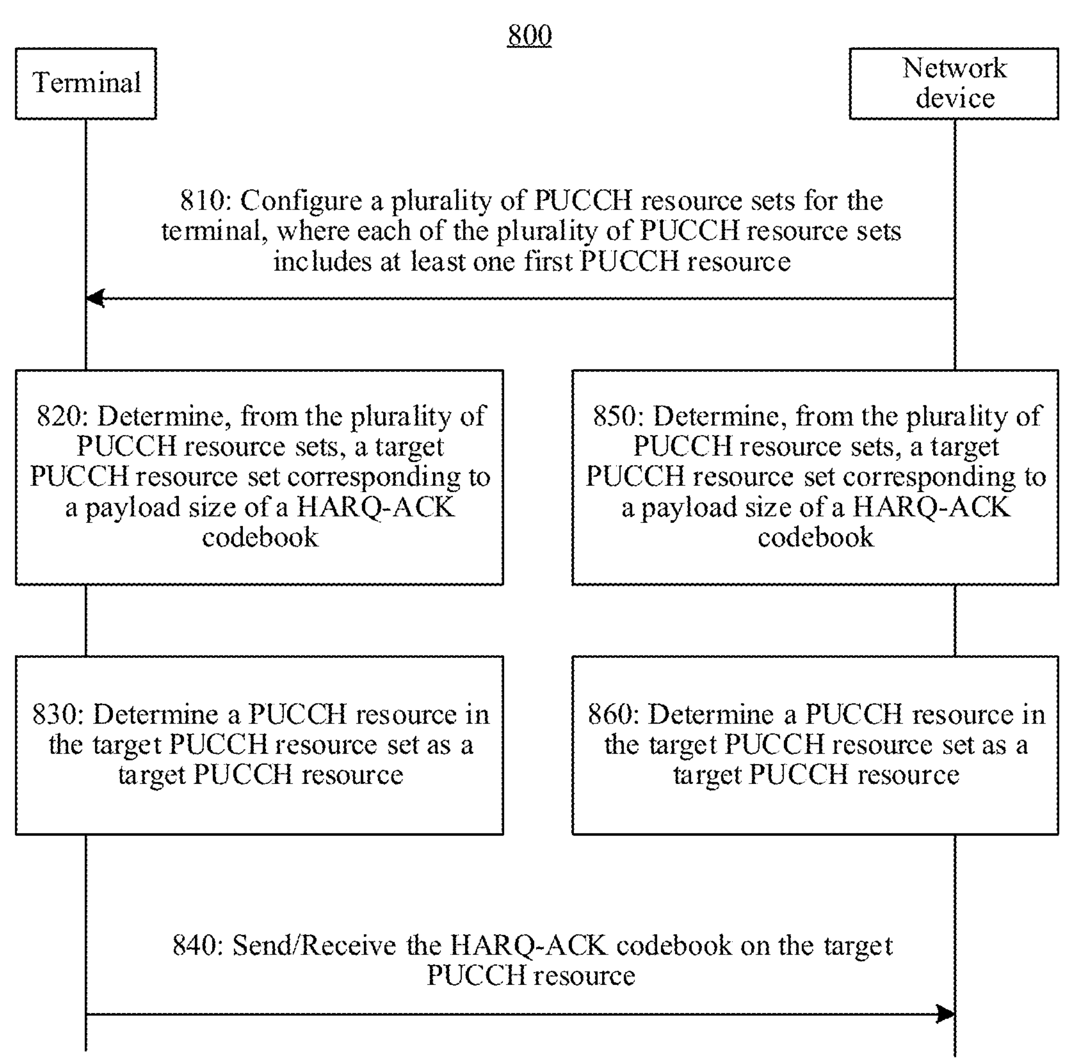
FIG. 8 is a schematic flowchart of another communication method according to an embodiment of this application.

The following provides two possible designs of a PUCCH resource set with reference to embodiments in FIG. 6 and FIG. 8.

In a possible design, in PUCCH resource sets configured by a network device for a terminal, a payload size range of each HARQ-ACK codebook may correspond to two PUCCH resource sets, and all PUCCH resources included in one PUCCH resource set (that is, the following first PUCCH resource set) in the two PUCCH resource sets do not cross subbands. For details, refer to a method 600 shown in FIG. 6. In another possible design, in PUCCH resource sets configured by a network device for a terminal, each PUCCH resource set corresponds to a payload size range of one HARQ-ACK codebook, and each PUCCH resource set includes at least one PUCCH resource that does not cross subbands. For details, refer to a method 800 shown in FIG. 8.

FIG. 6 is a schematic flowchart of a communication method 600 according to another embodiment of this application. As shown in FIG. 6, the method 600 includes step 610 to step 680. The following describes step 610 to step 680 in detail with reference to the accompanying drawings.

In step 610, a network device configures a plurality of PUCCH resource sets for a terminal.

In this embodiment of this application, a second time-frequency resource corresponds to one time unit in time domain. For ease of differentiation and description, in this application, the time unit corresponding to the second time-frequency resource is denoted as a second time unit. The second time unit includes one or more symbols.

When the second time unit is a subband U time unit, a full-band D and FD time unit, or a full-band U and FD time unit, a frequency domain resource corresponding to the second time-frequency resource includes a plurality of subbands, the plurality of subbands are consecutive non-overlapping frequency domain resources on the frequency domain resource corresponding to the second time-frequency resource, the plurality of subbands are on one carrier, and one or more symbols in the second time unit have different symbol categories on the plurality of subbands. In other words, the second time-frequency resource is applicable to an SBFD solution. For example, a carrier 6 shown in (b) in FIG. 5 includes three subbands: a subband 1, a subband 2, and a subband 3. Both a time-frequency resource corresponding to a slot 10 on the carrier 6 and a time-frequency resource corresponding to a slot 11 on the carrier 6 may be considered as second time-frequency resources, and both the slot 10 and the slot 11 may be second time units. In this case, all PUCCH resources included in each of the plurality of PUCCH resource sets configured by the network device for the terminal are in the frequency domain resource of the second time-frequency resource in frequency domain. In the plurality of PUCCH resource sets, every two PUCCH resource sets correspond to a payload size range of one HARQ-ACK codebook, and two PUCCH resource sets corresponding to a payload size range of one HARQ-ACK codebook may be considered as a group of PUCCH resource sets.

For ease of differentiation and description, two PUCCH resource sets corresponding to a payload size range of one HARQ-ACK codebook are respectively denoted as a first PUCCH resource set and a second PUCCH resource set below.

A slot format configured at an RRC layer is periodic, and there are two types of configurations: single cycle and dual cycle. Duration of the single cycle may be defined as T (T≥0) seconds, or a sum of duration of two cycles of the dual cycle may be defined as T seconds. Within time of T seconds, there are M (M≥1, and M is an integer) second time units. A second time unit in which N (N≥1, and N is an integer) second time-frequency resources are located in the M time units is determined based on configurations of symbol categories on a plurality of subbands in the M second time units and a definition of the second time-frequency resource. In the N second time-frequency resources, N1 (N1≥1, N1 is an integer, and N1≤N) second time-frequency resources are used to carry HARQ-ACK information. The network device may indicate, by using a DCI indication, RRC configuration information, or a MAC CE, a time-frequency resource on which the terminal sends the HARQ-ACK information, and the N1 second time-frequency resources may be determined accordingly.

It may be understood that the second time-frequency resource corresponding to the second time unit satisfies: Time domain corresponding to the second time-frequency resource is the second time unit, and frequency domain corresponding to the second time-frequency resource is frequency domain to which a BWP activated by the terminal belongs.

In a possible implementation A1, the first PUCCH resource set is a resource set including at least one first PUCCH resource, and the first PUCCH resource satisfies: A frequency domain resource of the first PUCCH resource belongs to one or more of the plurality of subbands, and a symbol category, of a time domain resource corresponding to the first PUCCH resource in at least one of the N1 second time units, on the subband to which the first PUCCH resource belongs is U, F, or FD. For example, PUCCH resources 2 in the slot 10 and the slot 11 shown in (b) in FIG. 5 are first PUCCH resources.

It should be noted that the first PUCCH resource may be referred to as a candidate first PUCCH resource on a second time-frequency resource. The candidate first PUCCH resource satisfies: A symbol category, of a time domain resource corresponding to the first PUCCH resource in a second time unit corresponding to the second time-frequency resource, on a subband to which the first PUCCH resource belongs is U, F, or FD. In this case, it may also be expressed as that there is a candidate first PUCCH resource on the second time-frequency resource.

In a possible implementation A2, there is at least one candidate first PUCCH resource on each of the N1 second time-frequency resources. The at least one candidate first PUCCH resource belongs to the first PUCCH resource set. It may be understood that the possible implementation A2 further limits the first PUCCH resource set in the foregoing possible implementation A1.

In a possible implementation A3, when the limitation on the first PUCCH resource set in the implementation A1 is satisfied, all PUCCH resources included in the first PUCCH resource set are candidate first PUCCH resources on at least one of the N1 second time-frequency resources. It may be understood that the possible implementation A3 further limits the first PUCCH resource set in the foregoing possible implementation A1.

In a possible implementation A4, when the limitation on the first PUCCH resource set in the implementation A2 is satisfied, all PUCCH resources included in the first PUCCH resource set are candidate first PUCCH resources on at least one of the N1 second time-frequency resources. It may be understood that the possible implementation A4 further limits the first PUCCH resource set in the foregoing possible implementation A2.

In a possible implementation A5, all PUCCH resources included in the first PUCCH resource set are candidate first PUCCH resources in the N1 second time-frequency resources. It may be understood that the possible implementation A5 further limits the first PUCCH resource set in the foregoing possible implementation A4.

The second PUCCH resource set may include a first PUCCH resource, or may not include a first PUCCH resource. This is not limited in this application.

A correspondence between the payload size range of the HARQ-ACK codebook and both the first PUCCH resource set and the second PUCCH resource set may be represented in a form of a table, or may be represented in another form. This is not limited in this application.

In addition, in this embodiment of this application, a third time-frequency resource may also correspond to one second time unit in time domain. A frequency domain resource corresponding to the third time-frequency resource includes a plurality of subbands. The plurality of subbands are consecutive non-overlapping frequency domain resources on the frequency domain resource corresponding to the third time-frequency resource. The plurality of subbands are on one carrier, and each symbol in the second time unit has a same symbol category on the plurality of subbands. In addition, a symbol category of one or more symbols in the second time unit on the plurality of subbands is U, FD, or F. In other words, the second time unit may be a full-band U slot, a full-band F slot, or a full-band FD slot. For example, a time-frequency resource corresponding to a slot 4 on a carrier 2 in (b) in FIG. 2 may be considered as a third time-frequency resource, and a time-frequency resource corresponding to a slot 13 on a carrier 7 in (c) in FIG. 5 may be considered as a third time-frequency resource. Alternatively, the second time unit may include a full-band U sub-slot, a full-band F sub-slot, a full-band FD sub-slot, or a full-band D sub-slot. It should be understood that a range of a sub-slot is smaller than that of a slot, and one slot may include a plurality of sub-slots. For example, one sub-slot may include seven symbols, that is, one slot may include two sub-slots. A slot 12 in (c) in FIG. 5 may include a first sub-slot (the $1^{st}$ symbol to the $7^{th}$ symbol) and a second sub-slot (the $8^{th}$ symbol to the $14^{th}$ symbol). In this case, a time-frequency resource corresponding to the second sub-slot in the slot 12 on the carrier 7 may be considered as a third time-frequency resource. It may be understood that the third time-frequency resource corresponding to the second time unit satisfies: Time domain corresponding to the third time-frequency resource is the second time unit, and frequency domain corresponding to the third time-frequency resource is frequency domain to which a BWP activated by the terminal belongs.

Similarly, the network device and the terminal may determine J (J≥0, and J is an integer) third time-frequency resources within the time of T seconds. In the J third time-frequency resources, J1 (J1≥0, J1 is an integer, and J1≤J) third time-frequency resources are used to carry HARQ-ACK information. The network device may indicate, by using a DCI indication, RRC configuration information, or a MAC CE, a time-frequency resource on which the terminal sends the HARQ-ACK information, and the J1 third time-frequency resources may be determined accordingly.

The foregoing five possible implementations A1, A2, A3, A4, and A5 are also applicable to the third time-frequency resource. For detailed content, refer to the foregoing possible implementations A1, A2, A3, A4, and A5. Details are not described herein again.

In step 620, the terminal determines, from the plurality of PUCCH resource sets, a first PUCCH resource set and a second PUCCH resource set that correspond to a payload size of a HARQ-ACK codebook.

The HARQ-ACK codebook may be a dynamic codebook, or may be a semi-persistent codebook. This is not limited in this embodiment of this application.

The terminal may determine, based on the payload size of the HARQ-ACK codebook, a HARQ-ACK codebook size range to which the payload size of the HARQ-ACK codebook belongs, and then determine, from the plurality of PUCCH resource sets, the first PUCCH resource set and the second PUCCH resource set that correspond to the payload size range of the HARQ-ACK codebook.

In step 630, the terminal determines a target PUCCH resource set from the first PUCCH resource set and the second PUCCH resource set.

After the terminal determines the first PUCCH resource set and the second PUCCH resource set that correspond to the payload size of the HARQ-ACK codebook, the terminal may determine the target PUCCH resource set from the two PUCCH resource sets, to subsequently further determine a PUCCH resource that can be used to send the HARQ-ACK codebook.

The following shows examples of several possible implementations of determining the target PUCCH resource set from the first PUCCH resource set and the second PUCCH resource set.

In a possible implementation B1, in the N1 second time-frequency resources, the terminal determines the first PUCCH resource set as the target PUCCH resource set.

With reference to a currently known technology, the network device performs resource scheduling, the network device and the terminal know a symbol category in each slot on each subband, and the network device may indicate, to the terminal by using indication information, a symbol category included in each slot. For example, the network device may indicate the symbol category in each slot to the terminal by using TDD-ConfigCommon and TDD-ConfigDedicated. The network device may alternatively indicate the symbol category in each slot to the terminal by using DCI 2-0. In addition, the terminal may further learn, based on DCI delivered by the network device to the terminal, of a slot for sending the HARQ-ACK codebook.

Therefore, according to the currently known technology, the terminal may learn, based on information indicated by the network device, of a symbol category in the slot in which the HARQ-ACK codebook needs to be sent. In other words, when the SBFD solution is used, the terminal may learn of a symbol category in the slot on each of a plurality of subbands included in an entire CC.

When the first PUCCH resource set configured by the network device for the terminal is in any one of the possible implementations A1, A2, A3, A4, and A5, the terminal may determine the first PUCCH resource set as the target PUCCH resource set when learning of the symbol category in the slot on each of the plurality of subbands included in the entire CC.

In a possible implementation B2, in the N1 second time-frequency resources, when the second time-frequency resource satisfies a constraint condition C1, the terminal may determine the second PUCCH resource set as the target PUCCH resource set.

The constraint condition C1 is a subset of a constraint condition C, and the constraint condition C may be:

- a symbol category on a subband to which the second time-frequency resource corresponding to the second time unit belongs is U or FD; or
- a symbol category on a subband to which the second time-frequency resource corresponding to the second time unit belongs is U or F; or
- a symbol category on a subband to which the second time-frequency resource corresponding to the second time unit belongs is F or FD; or
- a symbol category on a subband to which the second time-frequency resource corresponding to the second time unit belongs is U, FD, or F, and there are three types of symbol categories: U, FD, and F.

In addition, in a second time-frequency resource that does not satisfy the constraint condition C1 in the N1 second time-frequency resources, the terminal may determine the first PUCCH resource set as the target PUCCH resource set.

In a possible implementation D1, in the J1 third time-frequency resources, the terminal may determine the second PUCCH resource set as the target PUCCH resource set.

In a possible implementation D2, in the J1 third time-frequency resources, when a constraint condition E1 is satisfied, the terminal may determine the first PUCCH resource set as the target PUCCH resource set.

The constraint condition E1 is a subset of a constraint condition E, and the constraint condition E may be:

- a symbol category on a subband to which the third time-frequency resource corresponding to the second time unit belongs is F; or a symbol category on a subband to which the third time-frequency resource corresponding to the second time unit belongs is F or DL, and there are two types of symbol categories: F and FD.

In addition, in a third time-frequency resource that does not satisfy the constraint condition E1 in the J1 third time-frequency resources, the terminal may determine the second PUCCH resource set as the target PUCCH resource set.

It should be understood that, in the foregoing possible implementations B1, B2, D1, and D2, a limitation on the first PUCCH resource set may be that in any one of the implementations A1, A2, A3, A4, and A5, and the second PUCCH resource set is not limited.

In the foregoing several implementations, the network device and the terminal may determine the target PUCCH resource set based on a same rule, so that the target PUCCH resource set can be determined without additional signaling exchange.

In some possible implementations, the terminal may determine a target PUCCH resource based on an indication of the network device.

In a possible implementation F1, the terminal receives first indication information from the network device, where the first indication information includes a bitmap of N+J (N≥1, J≥0, and N and J are integers) bits. For ease of description, in this embodiment of this application, the bitmap of the N+J bits is denoted as a first bitmap. The N+J bits of the first bitmap correspond to N+J second time units, and a value of an $n^{th}$ (1≤n≤N+J, and n is an integer) bit in the first bitmap indicates one PUCCH resource set, in the first PUCCH resource set and the second PUCCH resource set, corresponding to an $n^{th}$ second time unit in the N+J second time units. The terminal determines the target PUCCH resource set based on a value of a bit corresponding to the second time unit in the first bitmap. Correspondingly, the network device sends the first indication information to the terminal.

Figure 7:
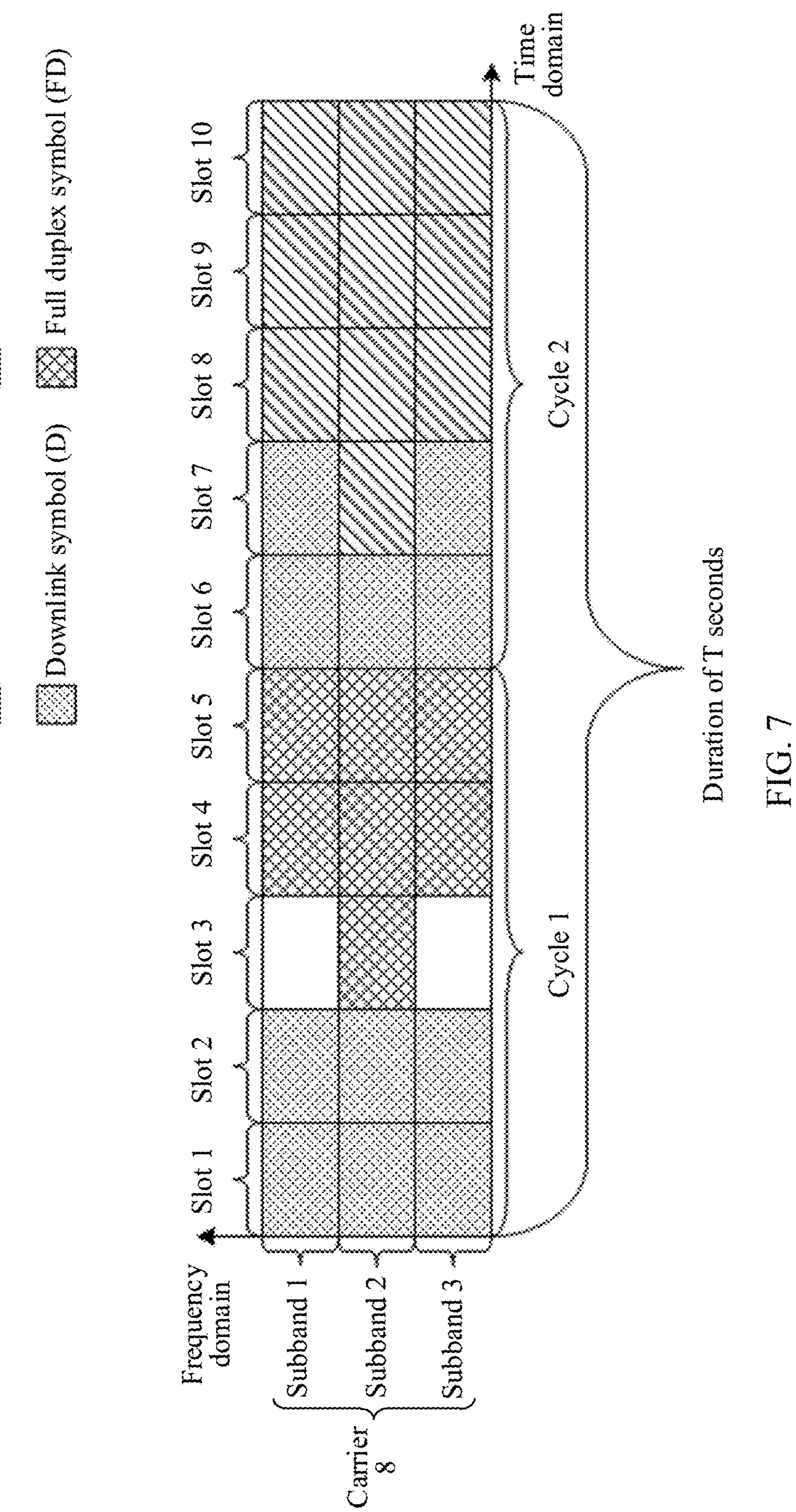
FIG. 7 is a diagram of a configuration format of a slot in a cycle.

Optionally, a time-frequency resource corresponding to the N+J second time units in a BWP may include at least one second time-frequency resource, that is, N≥1. As shown in FIG. 7, a slot format configured for the terminal by RRC is dual cycle, duration of each of two cycles is five slots, and T seconds include a total of 10 slots, for example, a slot 1 to a slot 10 shown in the figure. Time-frequency resources corresponding to the slot 3 and the slot 7 in the BWP are second time-frequency resources, that is, N=2. Time-frequency resources corresponding to the slot 4, the slot 5, the slot 8, the slot 9, and the slot 10 in the BWP are third time-frequency resources, that is, J=5.

For example, the first indication information may be RRC layer signaling. The network device indicates, by using the RRC layer signaling, which PUCCH resource set in the first PUCCH resource set and the second PUCCH resource set is to be used in each of the N+J time units. In other words, the network device indicates, by using the RRC layer signaling, whether the first PUCCH resource set is the target PUCCH resource set or the second PUCCH resource set is the target PUCCH resource set in each of the N+J time units. For example, when N+J=7, if "0" indicates that the first PUCCH resource set is used as the target PUCCH resource set, "1" indicates that the second PUCCH resource set is used as the target PUCCH resource set, and a value of the N+J bits is "0110111", it indicates that the first PUCCH resource set is used as the target PUCCH resource set in the $1^{st}$ slot and the $4^{th}$ slot in the seven slots, and the second PUCCH resource set is used as the target PUCCH resource set in the $2^{nd}$ slot, the $3^{rd}$ slot, and the $5^{th}$ slot to the $7^{th}$ slot in the seven slots. With reference to FIG. 7, the first PUCCH resource set is the target PUCCH resource set in the slot 3 and the slot 7, and the second PUCCH resource set is the target PUCCH resource set in the slot 4, the slot 5, and the slot 8 to the slot 10.

It should be understood that in actual application, "0" may indicate that the second PUCCH resource set is used as the target PUCCH resource set, and "1" may indicate that the first PUCCH resource set is used as the target PUCCH resource set. This is not limited in this embodiment of this application.

In a possible implementation F2, a bitmap indicates only a PUCCH resource set used for the second time-frequency resource, and a PUCCH resource set used for the third time-frequency resource may be implemented according to the possible implementation D1, D2, or the like. This is not limited in this implementation.

The terminal may receive first indication information from the network device. The first indication information includes a bitmap of N bits. For ease of description, in this embodiment of this application, the bitmap of the N bits is denoted as a second bitmap. The N bits of the second bitmap correspond to N second time units, and a value of an $n^{th}$ bit in the second bitmap indicates one PUCCH resource set, in the first PUCCH resource set and the second PUCCH resource set, corresponding to an $n^{th}$ second time unit in the N second time units, where 1≤n≤N, and N and n are integers. The terminal determines the target PUCCH resource set based on a value of a bit corresponding to the second time unit in the second bitmap. A detailed implementation process is similar to related descriptions in the possible implementation F1. For brevity, details are not described herein again. Correspondingly, the network device sends the first indication information to the terminal.

In a possible implementation F3, a bitmap indicates only a PUCCH resource set used for the third time-frequency resource.

A PUCCH resource set used for the second time-frequency resource may be implemented according to the possible implementation B1, B2, or the like. This is not limited in this implementation.

The terminal may receive first indication information from the network device. The first indication information includes a bitmap of J bits. For ease of description, in this embodiment of this application, the bitmap of the J bits is denoted as a third bitmap. The J bits of the third bitmap correspond to J second time units, and a value of a $j^{th}$ bit in the third bitmap indicates one PUCCH resource set, in the first PUCCH resource set and the second PUCCH resource set, corresponding to a $j^{th}$ second time unit in the J second time units, where 1≤j≤J, and J and j are integers. The terminal determines the target PUCCH resource set based on a value of a bit corresponding to the second time unit in the third bitmap. A detailed implementation process is similar to related descriptions in the possible implementation F1. For brevity, details are not described herein again. Correspondingly, the network device sends the first indication information to the terminal.

It should be understood that, in the foregoing possible implementations F1, F2, and F3, a limitation on the first PUCCH resource set may be that in any one of the implementations A1, A2, A3, A4, and A5, and the second PUCCH resource set is not limited. For brevity, details are not described herein.

In a possible implementation F4, the terminal may receive second indication information from the network device, where the second indication information includes an identifier of a PUCCH resource set; and the terminal determines a PUCCH resource set corresponding to the identifier in the first PUCCH resource set and the second PUCCH resource set as the target PUCCH resource set. Correspondingly, the network device sends the second indication information to the terminal, where the second indication information includes the identifier of the PUCCH resource set; and the network device determines the PUCCH resource set corresponding to the identifier in the first PUCCH resource set and the second PUCCH resource set as the target PUCCH resource set.

For example, the second indication information may be DCI. The network device may directly indicate an ID of a PUCCH resource set to the terminal by using the DCI. The terminal may directly determine a PUCCH resource set corresponding to the ID in the first PUCCH resource set and the second PUCCH resource set as the target PUCCH resource set. The terminal does not need to perform additional calculation or determining, and no additional power consumption is caused to the terminal.

It should be understood that, in the foregoing possible implementation F4, a limitation on the first PUCCH resource set may be that in any one of the implementations A1, A2, A3, A4, and A5, and the second PUCCH resource set is not limited.

In a possible implementation F5, the terminal may first select a PUCCH resource from a default PUCCH resource set, and if the selected PUCCH resource cannot be used to send the HARQ-ACK codebook, determine another PUCCH resource set as the target PUCCH resource set.

For example, assuming that the second PUCCH resource set is the default PUCCH resource set, the terminal may first determine, from the second PUCCH resource set with reference to a currently known technology, a PUCCH resource used to send the HARQ-ACK codebook. If the selected PUCCH resource cannot be used to send the HARQ-ACK codebook, it may be considered that a symbol category of a symbol on which the PUCCH resource is located includes at least one D, and therefore the PUCCH resource cannot be used to send the HARQ-ACK codebook. In this case, the terminal may directly use the first PUCCH resource set as the target PUCCH resource set.

It should be understood that, in the foregoing possible implementation F5, a limitation on the first PUCCH resource set may be that in any one of the implementations A1, A2, A3, A4, and A5, and the second PUCCH resource set is not limited.

In step 640, the terminal determines a PUCCH resource in the target PUCCH resource set as a target PUCCH resource.

After the terminal determines the target PUCCH resource set, according to a known technology, for example, when a quantity of PUCCH resources in the target PUCCH resource set is less than or equal to 8, the terminal may determine an index of a PUCCH resource in the PUCCH resource set based on an ARI field in DCI of the network device. A value of the ARI field is equal to an index of a PUCCH resource carrying HARQ-ACK information. When a quantity of PUCCH resources in the target PUCCH resource set is greater than 8, the terminal may determine an index of a PUCCH resource in the PUCCH resource set based on an ARI field, a quantity of CCEs included in a control resource set to which a resource carrying a PDCCH belongs, and an index of a first CCE in CCEs in which the PDCCH is located. The index of the PUCCH resource is determined, that is, the target PUCCH resource for sending the HARQ-ACK codebook is determined. This is not limited in this application.

In step 650, the terminal sends the HARQ-ACK codebook on the target PUCCH resource. Correspondingly, the network device may receive the HARQ-ACK codebook from the terminal on the target PUCCH resource.

After determining the target PUCCH resource for sending the HARQ-ACK codebook, the terminal may send the HARQ-ACK codebook to the network device on the PUCCH resource. Correspondingly, after determining the target PUCCH resource for receiving the HARQ-ACK codebook of the terminal, the network device may receive the HARQ-ACK codebook from the terminal on the target PUCCH resource.

In addition, the network device needs to determine in advance a PUCCH resource on which the HARQ-ACK codebook is to be received, and the PUCCH resource on which the HARQ-ACK codebook is to be received is related to the payload size of the HARQ-ACK codebook. Therefore, before receiving the HARQ-ACK codebook, the network device may first determine the target PUCCH resource. The following describes in detail an example process in which the network device determines the target PUCCH resource.

In step 660, the network device determines, from the plurality of PUCCH resource sets, the first PUCCH resource set and the second PUCCH resource set that correspond to the payload size of the HARQ-ACK codebook.

In a possible implementation, the network device may determine target candidate PDSCH reception occasions of the terminal in time-frequency domain, and determine the payload size of the HARQ-ACK codebook of the terminal based on these target candidate PDSCH reception occasions. Then, the network device may determine, based on the payload size of the HARQ-ACK codebook of the terminal from the plurality of PUCCH resource sets configured for the terminal, a group including the first PUCCH resource set and the second PUCCH resource set that correspond to the payload size of the HARQ-ACK codebook. Further, the network device may determine the target PUCCH resource set from the two resource sets, to subsequently further determine the PUCCH resource that can be used to receive the HARQ-ACK codebook of the terminal.

It should be understood that a manner in which the network device determines the target candidate PDSCH reception occasion may be the same as the manner of determining the target candidate PDSCH reception occasion in the foregoing method 300, or may be the same as a manner of determining a target candidate PDSCH reception occasion in an existing technology. This is not limited in this embodiment of this application.

After determining the first PUCCH resource set and the second PUCCH resource set that correspond to the payload size of the HARQ-ACK codebook, the network device may continue to perform step 670 to determine the target PUCCH resource set from the first PUCCH resource set and the second PUCCH resource set, and then perform step 680 to determine a PUCCH resource in the target PUCCH resource set as the target PUCCH resource. This can ensure that the HARQ-ACK codebook is correctly received.

It should be understood that an implementation in which the network device determines, from the plurality of PUCCH resource sets, the first PUCCH resource set and the second PUCCH resource set that correspond to the payload size of the HARQ-ACK codebook, determines the target PUCCH resource set from the first PUCCH resource set and the second PUCCH resource set, and determines the PUCCH resource in the target PUCCH resource set as the target PUCCH resource is similar to the foregoing implementation in which the terminal determines, from the plurality of PUCCH resource sets, the first PUCCH resource set and the second PUCCH resource set that correspond to the payload size of the HARQ-ACK codebook in step 620, the terminal determines the target PUCCH resource set from the first PUCCH resource set and the second PUCCH resource set in step 630, and the terminal determines the PUCCH resource in the target PUCCH resource set as the target PUCCH resource in step 640. Details are not described herein again.

In a use scenario of the SBFD solution, some PUCCH resource sets in the plurality of PUCCH resource sets configured by the network device for the terminal include at least one PUCCH resource that does not cross subbands. In this way, the terminal may flexibly select a PUCCH resource to transmit the HARQ-ACK codebook, to avoid a case in which no PUCCH resource is available for transmitting the HARQ-ACK codebook because all PUCCH resources cross subbands, thereby ensuring normal transmission of the HARQ-ACK codebook and ensuring transmission reliability. In addition, the terminal may transmit the HARQ-ACK codebook by using an uplink subband, or may transmit the HARQ-ACK codebook by using a full-band resource. Therefore, resource utilization is improved.

FIG. 8 is a schematic flowchart of a communication method 800 according to another embodiment of this application. As shown in FIG. 8, the method 800 may include step 810 to step 860. The following describes the method 800.

In step 810, a network device configures a plurality of PUCCH resource sets for a terminal, where each of the plurality of PUCCH resource sets includes at least one first PUCCH resource.

All PUCCH resources included in each of the plurality of PUCCH resource sets are in a frequency domain resource of a second time-frequency resource in frequency domain. In addition, each of the plurality of PUCCH resource sets corresponds to a payload size range of one HARQ-ACK codebook.

A definition of the second time-frequency resource in the method 800 is the same as the definition of the second time-frequency resource in the method 600. In other words, the second time-frequency resource corresponds to one time unit in time domain. In the method 800, the time unit corresponding to the second time-frequency resource is also denoted as a second time unit, and the second time unit includes one or more symbols.

When the second time unit is a subband U time unit, a full-band D and FD time unit, or a full-band U and FD time unit, a frequency domain resource corresponding to the second time-frequency resource includes a plurality of subbands, the plurality of subbands are consecutive non-overlapping frequency domain resources on the frequency domain resource corresponding to the second time-frequency resource, and the plurality of subbands are on one carrier. In this embodiment of this application, the one or more symbols in the second time unit have different symbol categories on the plurality of subbands. In other words, the second time-frequency resource is applicable to an SBFD solution. For example, a carrier 6 shown in (b) in FIG. 5 includes three subbands: a subband 1, a subband 2, and a subband 3. Both a time-frequency resource corresponding to a slot 10 on the carrier 6 and a time-frequency resource corresponding to a slot 11 on the carrier 6 may be considered as second time-frequency resources, and both the slot 10 and the slot 11 may be second time units. In this case, all PUCCH resources included in each of the plurality of PUCCH resource sets configured by the network device for the terminal are in the frequency domain resource of the second time-frequency resource in frequency domain. In the plurality of PUCCH resource sets, every two PUCCH resource sets correspond to a payload size range of one HARQ-ACK codebook, and two PUCCH resource sets corresponding to a payload size range of one HARQ-ACK codebook may be considered as a group of PUCCH resource sets.

Similarly, a slot format configured at an RRC layer is periodic, and there are two types of configurations: single cycle and dual cycle. Duration of the single cycle may be defined as T ($T \geq 0$) seconds, or a sum of duration of two cycles of the dual cycle may be defined as T seconds. Within time of T seconds, there are M ($M \geq 1$, and M is an integer) second time units. A second time unit in which N ($N \geq 1$, and N is an integer) second time-frequency resources are located in the M time units is determined based on configurations of symbol categories on a plurality of subbands in the M second time units and a definition of the second time-frequency resource. In the N second time-frequency resources, N1 ($N1 \geq 1$, N1 is an integer, and $N1 \leq N$) second time-frequency resources are used to carry HARQ-ACK information. The network device may indicate, by using a DCI indication, RRC configuration information, or a MAC CE, a time-frequency resource on which the terminal sends the HARQ-ACK information, and the N1 second time-frequency resources may be determined accordingly.

It may be understood that the second time-frequency resource corresponding to the second time unit satisfies: Time domain corresponding to the second time-frequency resource is the second time unit, and frequency domain corresponding to the second time-frequency resource is frequency domain to which a BWP activated by the terminal belongs.

In a possible implementation H1, each of the plurality of PUCCH resource sets configured by the network device for the terminal is a resource set including at least one first PUCCH resource, and the first PUCCH resource satisfies: A frequency domain resource of the first PUCCH resource belongs to one or more of the plurality of subbands, and a symbol category, of a time domain resource corresponding to the first PUCCH resource in at least one of the N1 second time units, on the subband to which the first PUCCH resource belongs is U, F, or FD. For example, PUCCH resources 2 in the slot 10 and the slot 11 shown in (b) in FIG. 5 are first PUCCH resources.

It should be noted that the first PUCCH resource may be referred to as a candidate first PUCCH resource on a second time-frequency resource. The candidate first PUCCH resource satisfies: A symbol category, of a time domain resource corresponding to the first PUCCH resource in a second time unit corresponding to the second time-frequency resource, on a subband to which the first PUCCH resource belongs is U, F, or FD. In this case, it may also be expressed as that there is a candidate first PUCCH resource on the second time-frequency resource.

In a possible implementation H2, for a PUCCH resource included in each of the plurality of PUCCH resource sets configured by the network device for the terminal, there is at least one candidate first PUCCH resource on the N1 second time-frequency resources. It may be understood that the possible implementation H2 further limits each of the plurality of PUCCH resource sets in the foregoing possible implementation H1.

In a possible implementation H3, when the limitation on each of the plurality of PUCCH resource sets in the implementation H1 is satisfied, all PUCCH resources included in each of the plurality of PUCCH resource sets are candidate first PUCCH resources on at least one of the N1 second time-frequency resources. It may be understood that the possible implementation H3 further limits each of the plurality of PUCCH resource sets in the foregoing possible implementation H1.

In a possible implementation H4, when the limitation on each of the plurality of PUCCH resource sets in the implementation H2 is satisfied, all PUCCH resources included in each of the plurality of PUCCH resource sets are candidate first PUCCH resources on at least one of the N1 second time-frequency resources. It may be understood that the possible implementation H4 further limits each of the plurality of PUCCH resource sets in the foregoing possible implementation H2.

In a possible implementation H5, all PUCCH resources included in each of the plurality of PUCCH resource sets configured by the network device for the terminal are candidate first PUCCH resources in the N1 second time-frequency resources. It may be understood that the possible implementation H5 further limits each of the plurality of PUCCH resource sets in the foregoing possible implementation H4.

In addition, in the method 800, a third time-frequency resource may also correspond to one second time unit in time domain. A frequency domain resource corresponding to the third time-frequency resource includes a plurality of subbands. The plurality of subbands are consecutive non-overlapping frequency domain resources on the frequency domain resource corresponding to the third time-frequency resource. The plurality of subbands are on one carrier, and a symbol in the second time unit has a same symbol category on the plurality of subbands. In addition, a symbol category of one or more symbols in the second time unit on the plurality of subbands is U, FD, or F. In other words, the second time unit may be a full-band U slot, a full-band F slot, or a full-band FD slot. For example, a time-frequency resource corresponding to a slot 4 on a carrier 2 in (b) in FIG. 2 may be considered as a third time-frequency resource, and a time-frequency resource corresponding to a slot 13 on a carrier 7 in (c) in FIG. 5 may be considered as a third time-frequency resource. Alternatively, the second time unit may include a full-band U sub-slot, a full-band F sub-slot, a full-band FD sub-slot, or a full-band D sub-slot. It should be understood that a range of a sub-slot is smaller than that of a slot, and one slot may include a plurality of sub-slots. For example, one sub-slot may include seven symbols, that is, one slot may include two sub-slots. A slot 12 in (c) in FIG. 5 may include a first sub-slot (the $1^{st}$ symbol to the $7^{th}$ symbol) and a second sub-slot (the $8^{th}$ symbol to the $14^{th}$ symbol). In this case, a time-frequency resource corresponding to the second sub-slot in the slot 12 on the carrier 7 may be considered as a third time-frequency resource. It may be understood that the third time-frequency resource corresponding to the second time unit satisfies: Time domain corresponding to the third time-frequency resource is the second time unit, and frequency domain corresponding to the third time-frequency resource is frequency domain to which a BWP activated by the terminal belongs. Similarly, the network device and the terminal may determine J ($J \geq 0$, and J is an integer) third time-frequency resources within the time of T seconds. In the J third time-frequency resources, J1 ($J1 \geq 0$, J1 is an integer, and $J1 \leq J$) third time-frequency resources are used to carry HARQ-ACK information. The network device may indicate, by using a DCI indication, RRC configuration information, or a MAC CE, a time-frequency resource on which the terminal sends the HARQ-ACK information, and the J1 third time-frequency resources may be determined accordingly. The foregoing five possible implementations H1, H2, H3, H4, and H5 are also applicable to the third time-frequency resource. For detailed content, refer to the foregoing possible implementations H1, H2, H3, H4, and H5. Details are not described herein again.

In step 820, the terminal determines, from the plurality of PUCCH resource sets, a PUCCH resource set corresponding to a payload size of a HARQ-ACK codebook as a target resource set. In step 850, the network device determines, from the plurality of PUCCH resource sets, a PUCCH resource set corresponding to a payload size of a HARQ-ACK codebook as a target resource set. The HARQ-ACK codebook is generated by the terminal.

In step 830, the terminal determines a PUCCH resource in the target PUCCH resource set as a target PUCCH resource. In step 860, the network device determines a PUCCH resource in the target PUCCH resource set as a target PUCCH resource.

In step 840, the terminal sends the HARQ-ACK codebook to the network device on the target PUCCH resource. Correspondingly, the network device receives the HARQ-ACK codebook from the terminal on the target PUCCH resource.

For an implementation process of step 820 to step 860, refer to a known technology. For example, the network device and the terminal may determine the target PUCCH resource set from the plurality of PUCCH resource sets based on the payload size of the HARQ-ACK codebook. The target PUCCH resource set corresponds to a payload size range of one HARQ-ACK codebook, and the payload size of the HARQ-ACK codebook is within the range. The terminal may determine, from the target PUCCH resource set by using information indicated by DCI or configured by an RRC layer, the PUCCH resource for sending the HARQ-ACK codebook. For example, if the second time unit is a subband U slot, the network device and the terminal may determine one of one or more first PUCCH resources as the target PUCCH resource. Details are not described again in this application.

It should be understood that a sequence of performing step 850 and step 860 and step 820 and step 830 is not limited in this application. In other words, before step 840, the terminal has performed step 820 and step 830, and the network device has performed step 850 and step 860.

Based on the foregoing solution, in a subband full duplex scenario, only a limitation that each PUCCH resource set configured by the network device for the terminal includes at least one first PUCCH resource needs to be set, and behavior of the terminal does not need to be greatly changed. This can avoid a problem that all PUCCH resources in a resource set configured for the terminal are on at least two subbands with different symbol categories, and consequently the HARQ-ACK codebook cannot be sent and received by using these PUCCH resources. An implementation is simple.

For ease of the following description, the method 300 described above may be denoted as a first method, the method 600 described above may be denoted as a second method, and the method 800 described above may be denoted as a third method. A fourth method and a fifth method are described below.

In the fourth method, different from the foregoing method 600, when an SBFD solution is used, a limitation that each of a plurality of PUCCH resource sets configured by a network device for a terminal includes a first PUCCH resource subset and a second PUCCH resource subset is set. The first PUCCH resource subset may correspond to the first PUCCH resource set in the method 600, and the second PUCCH resource subset may correspond to the second PUCCH resource set in the method 600.

A definition of a second time-frequency resource in this possible implementation is the same as the definition of the second time-frequency resource in the method 600. In other words, the second time-frequency resource corresponds to one time unit in time domain. In this implementation, the time unit corresponding to the second time-frequency resource is also denoted as a second time unit, and the second time unit includes one or more symbols.

When the second time unit is a subband U time unit, a full-band D and FD time unit, or a full-band U and FD time unit, a frequency domain resource corresponding to the second time-frequency resource includes a plurality of subbands, the plurality of subbands are consecutive non-overlapping frequency domain resources on the frequency domain resource corresponding to the second time-frequency resource, and the plurality of subbands are on one carrier. In this embodiment of this application, the one or more symbols in the second time unit have different symbol categories on the plurality of subbands. In other words, the second time-frequency resource is applicable to an SBFD solution. For example, a carrier 6 shown in (b) in FIG. 5 includes three subbands: a subband 1, a subband 2, and a subband 3. Both a time-frequency resource corresponding to a slot 10 on the carrier 6 and a time-frequency resource corresponding to a slot 11 on the carrier 6 may be considered as second time-frequency resources, and both the slot 10 and the slot 11 may be second time units. In this case, all PUCCH resources included in each of the plurality of PUCCH resource sets configured by the network device for the terminal are in a frequency domain resource of the second time-frequency resource in frequency domain. In the plurality of PUCCH resource sets, each PUCCH resource set corresponds to a payload size range of one HARQ-ACK codebook. In other words, the first PUCCH resource subset and the second PUCCH resource subset included in each PUCCH resource set correspond to a payload size range of a same HARQ-ACK codebook.

Similarly, a slot format configured at an RRC layer is periodic, and there are two types of configurations: single cycle and dual cycle. Duration of the single cycle may be defined as T (T≥0) seconds, or a sum of duration of two cycles of the dual cycle may be defined as T seconds. Within time of T seconds, there are M (M≥1, and M is an integer) second time units. A second time unit in which N (N≥1, and N is an integer) second time-frequency resources are located in the M time units is determined based on configurations of symbol categories on a plurality of subbands in the M second time units and a definition of the second time-frequency resource. In the N second time-frequency resources, N1 (N1≥1, N1 is an integer, and N1≤N) second time-frequency resources are used to carry HARQ-ACK information. The network device may indicate, by using a DCI indication, RRC configuration information, or a MAC CE, a time-frequency resource on which the terminal sends the HARQ-ACK information, and the N1 second time-frequency resources may be determined accordingly. It may be understood that the second time-frequency resource corresponding to the second time unit satisfies: Time domain corresponding to the second time-frequency resource is the second time unit, and frequency domain corresponding to the second time-frequency resource is frequency domain to which a BWP activated by the terminal belongs.

In a possible implementation L1, the first PUCCH resource subset is a resource set including at least one first PUCCH resource, and the first PUCCH resource satisfies: A frequency domain resource of the first PUCCH resource belongs to one or more of the plurality of subbands, and a symbol category, of a time domain resource corresponding to the first PUCCH resource in at least one of the N1 second time units, on the subband to which the first PUCCH resource belongs is U, F, or FD. For example, PUCCH resources 2 in the slot 10 and the slot 11 shown in (b) in FIG. 5 are first PUCCH resources.

It should be noted that the first PUCCH resource may be referred to as a candidate first PUCCH resource on a second time-frequency resource. The candidate first PUCCH resource satisfies: A symbol category, of a time domain resource corresponding to the first PUCCH resource in a second time unit corresponding to the second time-frequency resource, on a subband to which the first PUCCH resource belongs is U, F, or FD. In this case, it may also be expressed as that there is a candidate first PUCCH resource on the second time-frequency resource.

In a possible implementation L2, there is at least one candidate first PUCCH resource on each of the N1 second time-frequency resources. The at least one candidate first PUCCH resource belongs to the first PUCCH resource subset. It may be understood that the possible implementation L2 further limits the first PUCCH resource subset in the foregoing possible implementation L1.

In a possible implementation L3, when the limitation on the first PUCCH resource subset in the implementation L1 is satisfied, all PUCCH resources included in the first PUCCH resource subset are candidate first PUCCH resources on at least one of the N1 second time-frequency resources. It may be understood that the possible implementation L3 further limits the first PUCCH resource subset in the foregoing possible implementation L1.

In a possible implementation L4, when the limitation on the first PUCCH resource subset in the implementation L2 is satisfied, all PUCCH resources included in the first PUCCH resource subset are candidate first PUCCH resources on at least one of the N1 second time-frequency resources. It may be understood that the possible implementation L4 further limits the first PUCCH resource subset in the foregoing possible implementation L2.

In a possible implementation L5, all PUCCH resources included in the first PUCCH resource subset are candidate first PUCCH resources in the N1 second time-frequency resources. It may be understood that the possible implementation L5 further limits the first PUCCH resource subset in the foregoing possible implementation L4.

The second PUCCH resource subset may include a first PUCCH resource, or may not include a first PUCCH resource. This is not limited in this application.

A correspondence between the payload size range of the HARQ-ACK codebook and both the first PUCCH resource subset and the second PUCCH resource subset may be represented in a form of a table, or may be represented in another form. This is not limited in this application.

In addition, in this implementation, a third time-frequency resource may also correspond to one second time unit in time domain. A frequency domain resource corresponding to the third time-frequency resource includes a plurality of subbands. The plurality of subbands are consecutive non-overlapping frequency domain resources on the frequency domain resource corresponding to the third time-frequency resource. The plurality of subbands are on one carrier, and a symbol in the second time unit has a same symbol category on the plurality of subbands. In addition, a symbol category of one or more symbols in the second time unit on the plurality of subbands is U, FD, or F. In other words, the second time unit may be a full-band U slot, a full-band F slot, or a full-band FD slot. For example, a time-frequency resource corresponding to a slot 4 on a carrier 2 in (b) in FIG. 2 may be considered as a third time-frequency resource, and a time-frequency resource corresponding to a slot 13 on a carrier 7 in (c) in FIG. 5 may be considered as a third time-frequency resource. Alternatively, the second time unit may include a full-band U sub-slot, a full-band F sub-slot, a full-band FD sub-slot, or a full-band D sub-slot. It should be understood that a range of a sub-slot is smaller than that of a slot, and one slot may include a plurality of sub-slots. For example, one sub-slot may include seven symbols, that is, one slot may include two sub-slots. A slot 12 in (c) in FIG. 5 may include a first sub-slot (the $1^{st}$ symbol to the $7^{th}$ symbol) and a second sub-slot (the $8^{th}$ symbol to the $14^{th}$ symbol). In this case, a time-frequency resource corresponding to the second sub-slot in the slot 12 on the carrier 7 may be considered as a third time-frequency resource. It may be understood that the third time-frequency resource corresponding to the second time unit satisfies: Time domain corresponding to the third time-frequency resource is the second time unit, and frequency domain corresponding to the third time-frequency resource is frequency domain to which a BWP activated by the terminal belongs.

Similarly, the network device and the terminal may determine J (J≥0, and J is an integer) third time-frequency resources within the time of T seconds. In the J third time-frequency resources, J1 (J1≥0, J1 is an integer, and J1≤J) third time-frequency resources are used to carry HARQ-ACK information. The network device may indicate, by using a DCI indication, RRC configuration information, or a MAC CE, a time-frequency resource on which the terminal sends the HARQ-ACK information, and the J1 third time-frequency resources may be determined accordingly.

The foregoing five possible implementations L1, L2, L3, L4, and L5 are also applicable to the third time-frequency resource. For detailed content, refer to the foregoing possible implementations L1, L2, L3, L4, and L5. Details are not described herein again.

In this possible implementation, there are also a plurality of optional implementations in which the terminal and the network device determine a target PUCCH resource subset from the first PUCCH resource subset and the second PUCCH resource subset.

After the terminal determines the first PUCCH resource subset and the second PUCCH resource subset that correspond to the payload size of the HARQ-ACK codebook, the terminal may determine the target PUCCH resource subset from the two PUCCH resource subsets, to subsequently further determine a PUCCH resource that can be used to send the HARQ-ACK codebook.

The following shows examples of several possible implementations of determining the target PUCCH resource subset from the first PUCCH resource subset and the second PUCCH resource subset.

In a possible implementation O1, in the N1 second time-frequency resources, the terminal determines the first PUCCH resource subset as the target PUCCH resource subset.

With reference to a currently known technology, the network device performs resource scheduling, the network device and the terminal know a symbol category in each slot on each subband, and the network device may indicate, to the terminal by using indication information, a symbol category included in each slot. For example, the network device may indicate the symbol category in each slot to the terminal by using TDD-ConfigCommon and TDD-ConfigDedicated. The network device may alternatively indicate the symbol category in each slot to the terminal by using DCI 2-0. In addition, the terminal may further learn, based on DCI delivered by the network device to the terminal, of a slot for sending the HARQ-ACK codebook.

Therefore, according to the currently known technology, the terminal may learn, based on information indicated by the network device, of a symbol category in the slot in which the HARQ-ACK codebook needs to be sent. In other words, when the SBFD solution is used, the terminal may learn of a symbol category in the slot on each of a plurality of subbands included in an entire CC.

In a possible implementation O2, in the N1 second time-frequency resources, when the second time-frequency resource satisfies a constraint condition C1, the terminal may determine the second PUCCH resource subset as the target PUCCH resource subset. The constraint condition C1 is a subset of a constraint condition C. For a definition of the constraint condition C, refer to related descriptions in the method 600. For brevity, details are not described herein again.

In addition, in a second time-frequency resource that does not satisfy the constraint condition C1 in the N1 second time-frequency resources, the terminal may determine the first PUCCH resource subset as the target PUCCH resource subset.

In a possible implementation O3, in the J1 third time-frequency resources, the terminal may determine the second PUCCH resource subset as the target PUCCH resource subset.

In a possible implementation O4, in the J1 third time-frequency resources, when a constraint condition E1 is satisfied, the terminal may determine the first PUCCH resource subset as the target PUCCH resource subset. The constraint condition E1 is a subset of a constraint condition E. For a definition of the constraint condition E, refer to related descriptions in the method 600. For brevity, details are not described herein again.

In addition, in a third time-frequency resource that does not satisfy the constraint condition E1 in the J1 third time-frequency resources, the terminal may determine the second PUCCH resource subset as the target PUCCH resource subset.

It should be understood that, in the foregoing possible implementations O1, O2, O3, and O4, a limitation on the first PUCCH resource subset may be that in any one of the implementations L1, L2, L3, L4, and L5, and the second PUCCH resource subset is not limited.

In the foregoing several implementations, the network device and the terminal may determine the target PUCCH resource subset based on a same rule, so that the target PUCCH resource subset can be determined without additional signaling exchange.

In some possible implementations, the terminal may determine a target PUCCH resource based on an indication of the network device.

In a possible implementation O5, the terminal receives first indication information from the network device, where the first indication information includes a bitmap of N+J (N≥1, J≥0, and N and J are integers) bits. For ease of description, in this embodiment of this application, the bitmap of the N+J bits is denoted as a first bitmap. The N+J bits of the first bitmap correspond to N+J second time units, and a value of an $n^{th}$ ($1 \le n \le N+J$, and n is an integer) bit in the first bitmap indicates one PUCCH resource subset, in the first PUCCH resource subset and the second PUCCH resource subset, corresponding to an $n^{th}$ second time unit in the N+J second time units. The terminal determines the target PUCCH resource subset based on a value of a bit corresponding to the second time unit in the first bitmap. Correspondingly, the network device sends the first indication information to the terminal.

Optionally, a time-frequency resource corresponding to the N+J second time units in a BWP may include at least one second time-frequency resource, that is, $N \ge 1$. As shown in FIG. 7, a slot format configured for the terminal by RRC is dual cycle, duration of each of two cycles is five slots, and T seconds include a total of 10 slots, for example, a slot 1 to a slot 10 shown in the figure. Time-frequency resources corresponding to the slot 3 and the slot 7 in the BWP are second time-frequency resources, that is, N=2. Time-frequency resources corresponding to the slot 4, the slot 5, the slot 8, the slot 9, and the slot 10 in the BWP are third time-frequency resources, that is, J=5.

For example, the first indication information may be RRC layer signaling. The network device indicates, by using the RRC layer signaling, which PUCCH resource subset in the first PUCCH resource subset and the second PUCCH resource subset is to be used in each of the N+J time units. In other words, the network device indicates, by using the RRC layer signaling, whether the first PUCCH resource subset is the target PUCCH resource subset or the second PUCCH resource subset is the target PUCCH resource subset in each of the N+J time units. For example, when N+J=7, if "0" indicates that the first PUCCH resource subset is used as the target PUCCH resource subset, "1" indicates that the second PUCCH resource subset is used as the target PUCCH resource subset, and a value of the N+J bits is "0110111", it indicates that the first PUCCH resource subset is used as the target PUCCH resource subset in the $1^{st}$ slot and the $4^{th}$ slot in the seven slots, and the second PUCCH resource subset is used as the target PUCCH resource subset in the $2^{nd}$ slot, the $3^{rd}$ slot, and the $5^{th}$ slot to the $7^{th}$ slot in the seven slots. With reference to FIG. 7, the first PUCCH resource subset is the target PUCCH resource subset in the slot 3 and the slot 7, and the second PUCCH resource subset is the target PUCCH resource subset in the slot 4, the slot 5, and the slot 8 to the slot 10.

It should be understood that in actual application, "0" may indicate that the second PUCCH resource subset is used as the target PUCCH resource subset, and "1" may indicate that the first PUCCH resource subset is used as the target PUCCH resource subset. This is not limited in this embodiment of this application.

In a possible implementation O6, a bitmap indicates only a PUCCH resource subset used for the second time-frequency resource, and a PUCCH resource subset used for the third time-frequency resource may be implemented according to the possible implementation O3, 04, or the like. This is not limited in this implementation.

The terminal may receive first indication information from the network device. The first indication information includes a bitmap of N bits. For ease of description, in this embodiment of this application, the bitmap of the N bits is denoted as a second bitmap. The N bits of the second bitmap correspond to N second time units, and a value of an $n^{th}$ bit in the second bitmap indicates one PUCCH resource subset, in the first PUCCH resource subset and the second PUCCH resource subset, corresponding to an $n^{th}$ second time unit in the N second time units, where $1 \le n \le N$, and N and n are integers. The terminal determines the target PUCCH resource subset based on a value of a bit corresponding to the second time unit in the second bitmap. A detailed implementation process is similar to related descriptions in the possible implementation O5. For brevity, details are not described herein again. Correspondingly, the network device sends the first indication information to the terminal.

In a possible implementation O7, a bitmap indicates only a PUCCH resource subset used for the third time-frequency resource.

A PUCCH resource subset used for the second time-frequency resource may be implemented according to the possible implementation O1, O2, or the like. This is not limited in this implementation.

The terminal may receive first indication information from the network device. The first indication information includes a bitmap of J bits. For ease of description, in this embodiment of this application, the bitmap of the J bits is denoted as a third bitmap. The J bits of the third bitmap correspond to J second time units, and a value of a $j^{th}$ bit in the third bitmap indicates one PUCCH resource subset, in the first PUCCH resource subset and the second PUCCH resource subset, corresponding to a $j^{th}$ second time unit in the J second time units, where $1 \le j \le J$, and J and j are integers. The terminal determines the target PUCCH resource subset based on a value of a bit corresponding to the second time unit in the third bitmap. A detailed implementation process is similar to related descriptions in the possible implementation O5. For brevity, details are not described herein again. Correspondingly, the network device sends the first indication information to the terminal.

It should be understood that, in the foregoing possible implementations O5, O6, and O7, a limitation on the first PUCCH resource subset may be that in any one of the implementations L1, L2, L3, L4, and L5, and the second PUCCH resource subset is not limited. For brevity, details are not described herein.

In a possible implementation O8, the terminal may receive second indication information from the network device, where the second indication information includes an identifier of a PUCCH resource subset; and the terminal determines a PUCCH resource subset corresponding to the identifier in the first PUCCH resource subset and the second PUCCH resource subset as the target PUCCH resource subset. Correspondingly, the network device sends the second indication information to the terminal, where the second indication information includes the identifier of the PUCCH resource subset; and the network device determines the PUCCH resource set corresponding to the identifier in the first PUCCH resource subset and the second PUCCH resource subset as the target PUCCH resource subset.

For example, the second indication information may be DCI. The network device may directly indicate an ID of a PUCCH resource subset to the terminal by using the DCI. The terminal may directly determine a PUCCH resource subset corresponding to the ID in the first PUCCH resource subset and the second PUCCH resource subset as the target PUCCH resource subset. The terminal does not need to perform additional calculation or determining, and no additional power consumption is caused to the terminal.

It should be understood that, in the foregoing possible implementation O8, a limitation on the first PUCCH resource subset may be that in any one of the implementations L1, L2, L3, L4, and L5, and the second PUCCH resource subset is not limited.

In a possible implementation O9, the terminal may first select a PUCCH resource from a default PUCCH resource subset, and if the selected PUCCH resource cannot be used to send the HARQ-ACK codebook, determine another PUCCH resource subset as the target PUCCH resource subset.

For example, assuming that the second PUCCH resource subset is the default PUCCH resource subset, the terminal may first determine, from the second PUCCH resource subset with reference to a currently known technology, a PUCCH resource used to send the HARQ-ACK codebook. If the selected PUCCH resource cannot be used to send the HARQ-ACK codebook, it may be considered that a symbol category of a symbol on which the PUCCH resource is located includes at least one D, and therefore the PUCCH resource cannot be used to send the HARQ-ACK codebook. In this case, the terminal may directly use the first PUCCH resource subset as the target PUCCH resource subset.

After determining the target PUCCH resource subset, the terminal and the network device may determine, from the target PUCCH resource subset according to a known technology, a target PUCCH resource for sending the HARQ-ACK codebook. For brevity, details are not described herein again.

It should be understood that, in the foregoing possible implementation O9, a limitation on the first PUCCH resource subset may be that in any one of the implementations L1, L2, L3, L4, and L5, and the second PUCCH resource subset is not limited.

In the fifth method, different from the foregoing method 600, a network device may configure a PUCCH resource set for a terminal according to a currently known solution (a payload size range of one HARQ-ACK codebook corresponds to one PUCCH resource set), and indicate a target PUCCH resource to the terminal by using DCI or RRC layer signaling. The terminal also determines a target PUCCH resource set and a target PUCCH resource according to a currently known solution. When the target PUCCH resource finally determined by the terminal cannot be used to send a HARQ-ACK codebook, the terminal may shift the determined target PUCCH resource in a second time unit, so that the determined target PUCCH resource can be used to send the HARQ-ACK codebook.

Optionally, the target PUCCH resource is sequentially shifted from a symbol with a smallest symbol index in a time unit in which the target PUCCH resource is located toward a symbol with a largest symbol index, and whether the HARQ-ACK codebook can be sent by using the target PUCCH is attempted on each symbol. In addition, when an attempt is made on each symbol, the attempt starts from a location with a smallest start resource block index of the target PUCCH resource.

Figure 9:
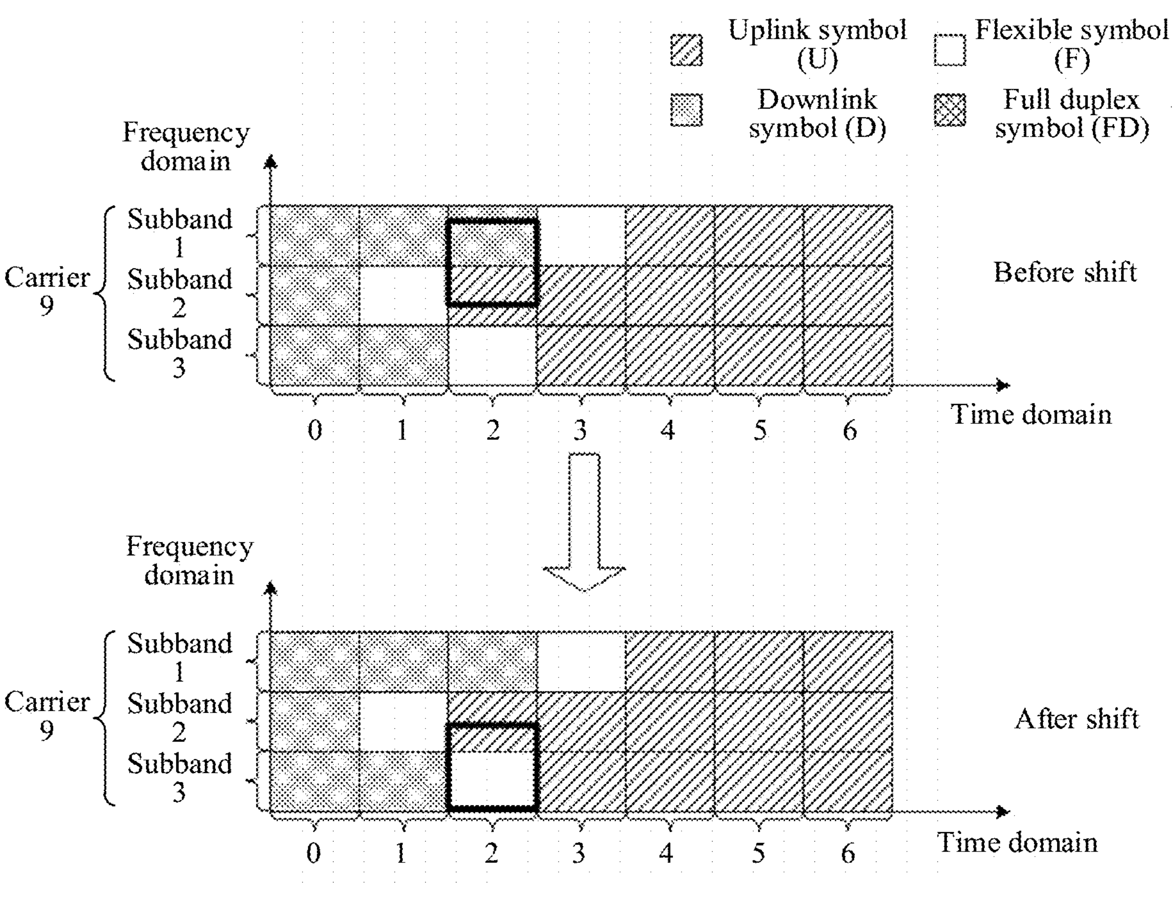
FIG. 9 is a diagram of comparison before and after a target PUCCH resource is shifted.

As shown in FIG. 9, it is assumed that the second time unit includes seven symbols, symbol indices are respectively 0 to 6, and the target PUCCH resource indicated before shift cannot be used to send the HARQ-ACK codebook. First, the target PUCCH resource is shifted to a symbol 0, and a bottom-up shift is performed on the symbol 0 for an attempt. If the target PUCCH resource cannot be used to send the HARQ-ACK codebook, the target PUCCH resource is shifted to a symbol 1 for an attempt. If the target PUCCH resource still cannot be used to send the HARQ-ACK codebook, the target PUCCH resource is shifted to a symbol 2 for an attempt. In this case, the target PUCCH resource can be used to send the HARQ-ACK codebook.

It should be understood that FIG. 9 is merely an example, and should not be construed as any limitation on this application.

Embodiments of this application provide a plurality of communication methods, for example, the method 300, the method 600, the method 800, a fourth method, and a fifth method. The method 300, the method 600, the method 800, the fourth method, the fifth method, and the like may be separately used, or may be used in combination. For example, the method 300 may be used in combination with the method 600. After a HARQ-ACK codebook is determined in the method 300, a target resource set and a target resource may be determined based on a payload size of the HARQ-ACK codebook in the method 600. For another example, the method 300 may be used in combination with the method 800. After a HARQ-ACK codebook is determined in the method 300, a target resource set and a target resource may be determined based on a payload size of the HARQ-ACK codebook in the method 800. This is not limited in this application.

Figure 10:
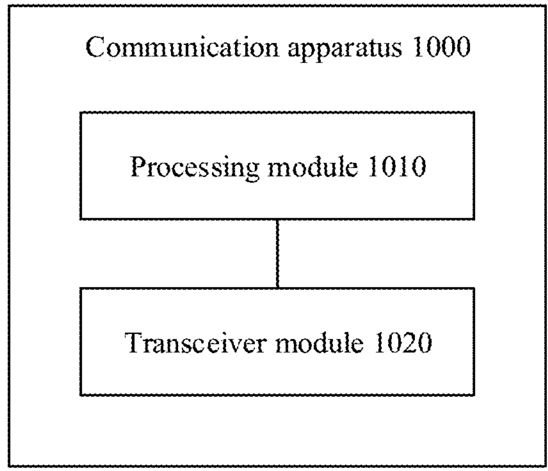
FIG. 10 is a block diagram of a communication apparatus according to an embodiment of this application.

FIG. 10 is a block diagram of a communication apparatus according to an embodiment of this application. As shown in FIG. 10, the communication apparatus 1000 may include a processing module 1010 and a transceiver module 1020. The communication apparatus 1000 may be configured to perform the steps performed by the terminal or the network device in the communication method provided in embodiments of this application.

For example, when the communication apparatus 1000 is configured to perform the steps performed by the terminal in the communication method 300, the processing module 1010 may be configured to determine a target candidate PDSCH reception occasion from a first time-frequency resource, where the target candidate PDSCH reception occasion includes at least one symbol, the target candidate PDSCH reception occasion is used to receive a PDSCH, the first time-frequency resource corresponds to a first time unit in time domain, the first time unit includes one or more symbols, a frequency domain resource corresponding to the first time-frequency resource includes a plurality of subbands, the plurality of subbands are consecutive non-overlapping frequency domain resources on the frequency domain resource corresponding to the first time-frequency resource, the plurality of subbands are on one carrier, the one or more symbols in the first time unit have different symbol categories on the plurality of subbands, and each symbol included in the target candidate PDSCH reception occasion satisfies: a symbol category on at least one of the plurality of subbands is downlink, flexible, or full duplex, or a symbol category on a first subband in the plurality of subbands is downlink, flexible, or full duplex; the processing module 1010 may be further configured to determine a HARQ-ACK codebook based on a plurality of target candidate PDSCH reception occasions; and the transceiver module 1020 may be configured to send the HARQ-ACK codebook.

Optionally, the first subband is a subband with a highest priority in the plurality of subbands.

Optionally, the first subband is a subband specified by a network device in the plurality of subbands.

For example, when the communication apparatus 1000 is configured to perform the steps performed by the network device in the communication method 300, the processing module 1010 may be configured to determine a target candidate PDSCH reception occasion from a first time-frequency resource configured for a terminal, where the target candidate PDSCH reception occasion includes at least one symbol, the target candidate PDSCH reception occasion is used by the terminal to receive a PDSCH, the first time-frequency resource corresponds to a first time unit in time domain, the first time unit includes one or more symbols, a frequency domain resource corresponding to the first time-frequency resource includes a plurality of subbands, the plurality of subbands are consecutive non-overlapping frequency domain resources on the frequency domain resource corresponding to the first time-frequency resource, the plurality of subbands are on one carrier, the one or more symbols in the first time unit have different symbol categories on the plurality of subbands, and each symbol included in the target candidate PDSCH reception occasion satisfies: a symbol category on at least one of the plurality of subbands is downlink, flexible, or full duplex, or a symbol category on a first subband in the plurality of subbands is downlink, flexible, or full duplex; the processing module 1010 may be further configured to determine a payload size of a HARQ-ACK codebook of the terminal based on a plurality of target candidate PDSCH reception occasions of the terminal; and the transceiver module 1020 may be configured to receive the HARQ-ACK codebook from the terminal based on the payload size of the HARQ-ACK codebook.

Optionally, the first subband is a subband with a highest priority in the plurality of subbands.

Optionally, the first subband is a subband specified by a network device in the plurality of subbands.

For example, when the communication apparatus 1000 is configured to perform the steps performed by the terminal in the communication method 600, the processing module 1010 may be configured to determine, from a plurality of PUCCH resource sets, a first PUCCH resource set and a second PUCCH resource set that correspond to a payload size of a HARQ-ACK codebook, where all PUCCH resources included in each of the plurality of PUCCH resource sets are in a frequency domain resource of a second time-frequency resource in frequency domain, the second time-frequency resource corresponds to a second time unit in time domain, the second time unit includes one or more symbols, the frequency domain resource corresponding to the second time-frequency resource includes a plurality of subbands, the plurality of subbands are consecutive non-overlapping frequency domain resources on the frequency domain resource corresponding to the second time-frequency resource, the plurality of subbands are on one carrier, the one or more symbols in the second time unit have different symbol categories on the plurality of subbands, the first PUCCH resource set includes at least one first PUCCH resource, and the first PUCCH resource satisfies: a frequency domain resource of the first PUCCH resource is in one of the plurality of subbands, and a symbol category, of a time domain resource corresponding to the first PUCCH resource in the second time unit, on the subband to which the first PUCCH resource belongs is uplink, flexible, or full duplex; the processing module 1010 may be further configured to: determine a target PUCCH resource set from the first PUCCH resource set and the second PUCCH resource set; and determine a PUCCH resource in the target PUCCH resource set as a target PUCCH resource; and the transceiver module 1020 may be configured to send the HARQ-ACK codebook on the target PUCCH resource.

Optionally, all resources included in the first PUCCH resource set are first PUCCH resources; and the processing module 1010 may be configured to determine the first PUCCH resource set as the target PUCCH resource set.

Optionally, the transceiver module 1020 may be configured to receive first indication information from a network device, where the first indication information includes a bitmap of N bits, the N bits correspond to N time units, a value of an $n^{th}$ bit in the bitmap indicates a PUCCH resource set that is in the first PUCCH resource set and the second PUCCH resource set and that corresponds to an $n^{th}$ time unit in the N time units, $1 \le n \le N$, and N and n are integers. The processing module 1010 may be configured to determine the target PUCCH resource set based on a value of a bit corresponding to the second time unit in the bitmap.

Optionally, the transceiver module 1020 may be configured to receive second indication information from a network device, where the second indication information includes an identifier of a PUCCH resource set. The processing module 1010 may be configured to determine a PUCCH resource set corresponding to the identifier in the first PUCCH resource set and the second PUCCH resource set as the target PUCCH resource set.

For example, when the communication apparatus 1000 is configured to perform the steps performed by the network device in the communication method 600, the processing module 1010 may be configured to configure a plurality of PUCCH resource sets for a terminal, where all PUCCH resources included in each of the plurality of PUCCH resource sets are in a frequency domain resource of a second time-frequency resource in frequency domain, the second time-frequency resource corresponds to a second time unit in time domain, the second time unit includes one or more symbols, the frequency domain resource corresponding to the second time-frequency resource includes a plurality of subbands, the plurality of subbands are consecutive non-overlapping frequency domain resources on the frequency domain resource corresponding to the second time-frequency resource, the plurality of subbands are on one carrier, and the one or more symbols in the second time unit have different symbol categories on the plurality of subbands; the processing module 1010 may be further configured to: determine, from the plurality of PUCCH resource sets, a first PUCCH resource set and a second PUCCH resource set that correspond to a payload size of a HARQ-ACK codebook, where the first PUCCH resource set is a resource set including at least one first PUCCH resource, the first PUCCH resource satisfies: a frequency domain resource of the first PUCCH resource is in one of the plurality of subbands, and a symbol category, of a time domain resource corresponding to the first PUCCH resource in the second time unit, on the subband to which the first PUCCH resource belongs is uplink, flexible, or full duplex, and the HARQ-ACK codebook is generated by the terminal; determine a target PUCCH resource set from the first PUCCH resource set and the second PUCCH resource set; and determine a PUCCH resource in the target PUCCH resource set as a target PUCCH resource; and the transceiver module 1020 may be configured to receive the HARQ-ACK codebook on the target PUCCH resource.

Optionally, all resources included in the first PUCCH resource set are first PUCCH resources; and the processing module 1010 may be configured to determine the first PUCCH resource set as the target PUCCH resource set.

Optionally, the transceiver module 1020 may be configured to send first indication information to the terminal, where the first indication information includes a bitmap of N bits, the N bits correspond to N time units, a value of an $n^{th}$ bit in the bitmap indicates a PUCCH resource set that is in the first PUCCH resource set and the second PUCCH resource set and that corresponds to an $n^{th}$ time unit in the N time units, $1 \le n \le N$, and N and n are integers. The processing module 1010 may be configured to determine the target PUCCH resource set based on a value of a bit corresponding to the second time unit in the bitmap.

Optionally, the transceiver module 1020 may be configured to send second indication information to the terminal, where the second indication information includes an identifier of a PUCCH resource set. The processing module 1010 may be configured to determine a PUCCH resource set corresponding to the identifier in the first PUCCH resource set and the second PUCCH resource set as the target PUCCH resource set.

For example, when the communication apparatus 1000 is configured to perform the steps performed by the terminal in the communication method 800, the processing module 1010 may be configured to determine, from a plurality of PUCCH resource sets configured by a network device, a PUCCH resource set corresponding to a payload size of a HARQ-ACK codebook as a target resource set, where the HARQ-ACK codebook is generated by the terminal, each of the plurality of PUCCH resource sets includes at least one first PUCCH resource, all PUCCH resources included in each of the plurality of PUCCH resource sets are in a frequency domain resource of a second time-frequency resource in frequency domain, the second time-frequency resource corresponds to a second time unit in time domain, the second time unit includes one or more symbols, the frequency domain resource corresponding to the second time-frequency resource includes a plurality of subbands, the plurality of subbands are consecutive non-overlapping frequency domain resources on the frequency domain resource corresponding to the second time-frequency resource, the plurality of subbands are on one carrier, the one or more symbols in the second time unit have different symbol categories on the plurality of subbands, and the first PUCCH resource satisfies: a frequency domain resource of the first PUCCH resource is in one of the plurality of subbands, and a symbol category, of a time domain resource corresponding to the first PUCCH resource in the second time unit, on the subband to which the first PUCCH resource belongs is uplink, flexible, or full duplex; the processing module 1010 may be further configured to determine a PUCCH resource in the target PUCCH resource set as a target PUCCH resource; and the transceiver module 1020 may be configured to send the HARQ-ACK codebook on the target PUCCH resource.

For example, when the communication apparatus 1000 is configured to perform the steps performed by the network device in the communication method 800, the processing module 1010 may be configured to configure a plurality of PUCCH resource sets for a terminal, where each of the plurality of PUCCH resource sets includes at least one first PUCCH resource, all PUCCH resources included in each of the plurality of PUCCH resource sets are in a frequency domain resource of a second time-frequency resource in frequency domain, the second time-frequency resource corresponds to a second time unit in time domain, the second time unit includes one or more symbols, the frequency domain resource corresponding to the second time-frequency resource includes a plurality of subbands, the plurality of subbands are consecutive non-overlapping frequency domain resources on the frequency domain resource corresponding to the second time-frequency resource, the plurality of subbands are on one carrier, the one or more symbols in the second time unit have different symbol categories on the plurality of subbands, and the first PUCCH resource satisfies: a frequency domain resource of the first PUCCH resource is in one of the plurality of subbands, and a symbol category, of a time domain resource corresponding to the first PUCCH resource in the second time unit, on the subband to which the first PUCCH resource belongs is uplink, flexible, or full duplex; the processing module 1010 may be further configured to: determine, from the plurality of PUCCH resource sets, a PUCCH resource set corresponding to a payload size of a HARQ-ACK codebook as a target resource set, where the HARQ-ACK codebook is generated by the terminal; and determine a PUCCH resource in the target PUCCH resource set as a target PUCCH resource; and the transceiver module 1020 may be configured to receive the HARQ-ACK codebook on the target PUCCH resource.

Figure 11:
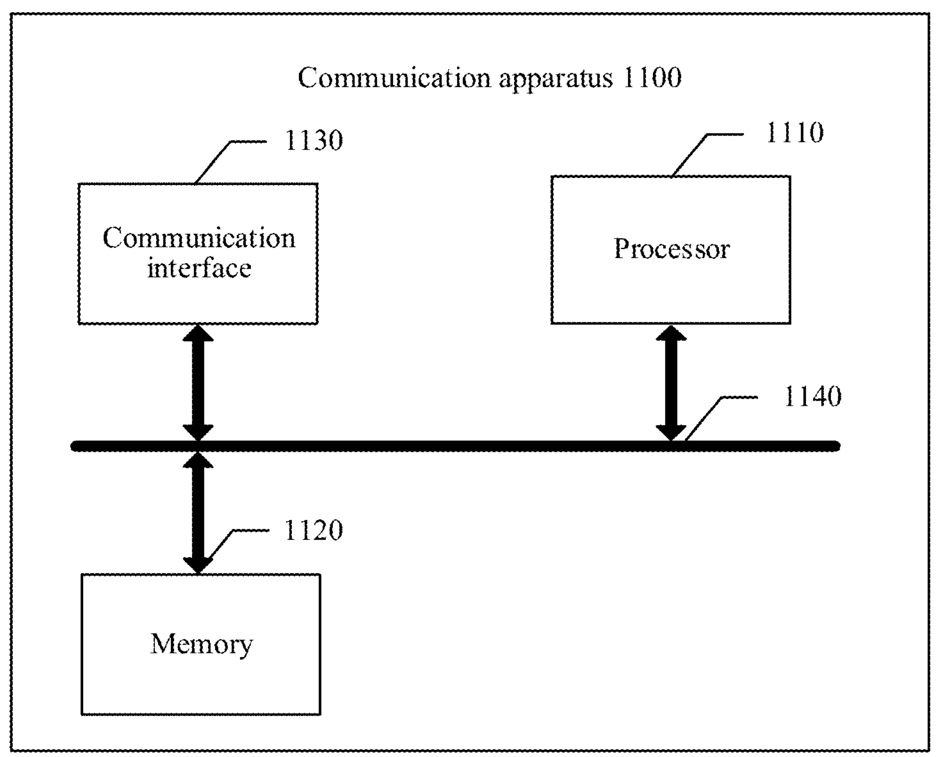
FIG. 11 is another block diagram of a communication apparatus according to an embodiment of this application.

FIG. 11 is another block diagram of a communication apparatus according to an embodiment of this application. The communication apparatus 1100 may be configured to implement a function of the terminal or the network device in the foregoing method. The communication apparatus 1100 may be a chip system. In embodiments of this application, the chip system may include a chip, or may include a chip and another discrete component.

As shown in FIG. 11, the communication apparatus 1100 may include at least one processor 1110, configured to implement the function of the terminal or the network device in the method provided in embodiments of this application.

For example, when the communication apparatus 1100 is configured to implement the function of the terminal in the method 300 provided in embodiments of this application, the processor 1110 may be configured to: determine a target candidate PDSCH reception occasion from a first time-frequency resource, where the target candidate PDSCH reception occasion includes at least one symbol, the target candidate PDSCH reception occasion is used to receive a PDSCH, the first time-frequency resource corresponds to a first time unit in time domain, the first time unit includes one or more symbols, a frequency domain resource corresponding to the first time-frequency resource includes a plurality of subbands, the plurality of subbands are consecutive non-overlapping frequency domain resources on the frequency domain resource corresponding to the first time-frequency resource, the plurality of subbands are on one carrier, the one or more symbols in the first time unit have different symbol categories on the plurality of subbands, and each symbol included in the target candidate PDSCH reception occasion satisfies: a symbol category on at least one of the plurality of subbands is downlink, flexible, or full duplex, or a symbol category on a first subband in the plurality of subbands is downlink, flexible, or full duplex; determine a HARQ-ACK codebook based on a plurality of target candidate PDSCH reception occasions; and send the HARQ-ACK codebook. For details, refer to the detailed descriptions in the method examples. Details are not described herein again.

For example, when the communication apparatus 1100 is configured to implement the function of the network device in the method 300 provided in embodiments of this application, the processor 1110 may be configured to: determine a target candidate PDSCH reception occasion from a first time-frequency resource configured for a terminal, where the target candidate PDSCH reception occasion includes at least one symbol, the target candidate PDSCH reception occasion is used by the terminal to receive a PDSCH, the first time-frequency resource corresponds to a first time unit in time domain, the first time unit includes one or more symbols, a frequency domain resource corresponding to the first time-frequency resource includes a plurality of subbands, the plurality of subbands are consecutive non-overlapping frequency domain resources on the frequency domain resource corresponding to the first time-frequency resource, the plurality of subbands are on one carrier, the one or more symbols in the first time unit have different symbol categories on the plurality of subbands, and each symbol included in the target candidate PDSCH reception occasion satisfies: a symbol category on at least one of the plurality of subbands is downlink, flexible, or full duplex, or a symbol category on a first subband in the plurality of subbands is downlink, flexible, or full duplex; determine a payload size of a HARQ-ACK codebook of the terminal based on a plurality of target candidate PDSCH reception occasions of the terminal; and receive the HARQ-ACK codebook from the terminal based on the payload size of the HARQ-ACK codebook. For details, refer to the detailed descriptions in the method examples. Details are not described herein again.

For example, when the communication apparatus 1100 is configured to implement the function of the terminal in the method 600 provided in embodiments of this application, the processor 1110 may be configured to: determine, from a plurality of PUCCH resource sets configured by a network device, a first PUCCH resource set and a second PUCCH resource set that correspond to a payload size of a HARQ-ACK codebook, where all PUCCH resources included in each of the plurality of PUCCH resource sets are in a frequency domain resource of a second time-frequency resource in frequency domain, the second time-frequency resource corresponds to a second time unit in time domain, the second time unit includes one or more symbols, the frequency domain resource corresponding to the second time-frequency resource includes a plurality of subbands, the plurality of subbands are consecutive non-overlapping frequency domain resources on the frequency domain resource corresponding to the second time-frequency resource, the plurality of subbands are on one carrier, the one or more symbols in the second time unit have different symbol categories on the plurality of subbands, the first PUCCH resource set is a resource set including at least one first PUCCH resource, and the first PUCCH resource satisfies: a frequency domain resource of the first PUCCH resource is in one of the plurality of subbands, and a symbol category, of a time domain resource corresponding to the first PUCCH resource in the second time unit, on the subband to which the first PUCCH resource belongs is uplink, flexible, or full duplex; determine a target PUCCH resource set from the first PUCCH resource set and the second PUCCH resource set; determine a PUCCH resource in the target PUCCH resource set as a target PUCCH resource; and send the HARQ-ACK codebook on the target PUCCH resource. For details, refer to the detailed descriptions in the method examples. Details are not described herein again.

For example, when the communication apparatus 1100 is configured to implement the function of the network device in the method 600 provided in embodiments of this application, the processor 1110 may be configured to: configure a plurality of PUCCH resource sets for a terminal, where all PUCCH resources included in each of the plurality of PUCCH resource sets are in a frequency domain resource of a second time-frequency resource in frequency domain, the second time-frequency resource corresponds to a second time unit in time domain, the second time unit includes one or more symbols, the frequency domain resource corresponding to the second time-frequency resource includes a plurality of subbands, the plurality of subbands are consecutive non-overlapping frequency domain resources on the frequency domain resource corresponding to the second time-frequency resource, the plurality of subbands are on one carrier, and the one or more symbols in the second time unit have different symbol categories on the plurality of subbands; determine, by the network device from the plurality of PUCCH resource sets, a first PUCCH resource set and a second PUCCH resource set that correspond to a payload size of a HARQ-ACK codebook, where the first PUCCH resource set is a resource set including at least one first PUCCH resource, the first PUCCH resource satisfies: a frequency domain resource of the first PUCCH resource is in one of the plurality of subbands, and a symbol category, of a time domain resource corresponding to the first PUCCH resource in the second time unit, on the subband to which the first PUCCH resource belongs is uplink, flexible, or full duplex, and the HARQ-ACK codebook is generated by the terminal; determine a target PUCCH resource set from the first PUCCH resource set and the second PUCCH resource set; determine a PUCCH resource in the target PUCCH resource set as a target PUCCH resource; and receive the HARQ-ACK codebook on the target PUCCH resource. For details, refer to the detailed descriptions in the method examples. Details are not described herein again.

For example, when the communication apparatus 1100 is configured to implement the function of the terminal in the method 800 provided in embodiments of this application, the processor 1110 may be configured to: determine, from a plurality of PUCCH resource sets configured by a network device, a target PUCCH resource set corresponding to a payload size of a HARQ-ACK codebook, where each of the plurality of PUCCH resource sets includes at least one first PUCCH resource, all PUCCH resources included in each of the plurality of PUCCH resource sets are in a frequency domain resource of a second time-frequency resource in frequency domain, the second time-frequency resource corresponds to a second time unit in time domain, the second time unit includes one or more symbols, the frequency domain resource corresponding to the second time-frequency resource includes a plurality of subbands, the plurality of subbands are consecutive non-overlapping frequency domain resources on the frequency domain resource corresponding to the second time-frequency resource, the plurality of subbands are on one carrier, the one or more symbols in the second time unit have different symbol categories on the plurality of subbands, and the first PUCCH resource satisfies: a frequency domain resource of the first PUCCH resource is in one of the plurality of subbands, and a symbol category, of a time domain resource corresponding to the first PUCCH resource in the second time unit, on the subband to which the first PUCCH resource belongs is uplink, flexible, or full duplex; determine, from the plurality of PUCCH resource sets, a PUCCH resource set corresponding to a payload size of a HARQ-ACK codebook as a target resource set, where the HARQ-ACK codebook is generated by the terminal; determine a PUCCH resource in the target PUCCH resource set as a target PUCCH resource; and send the HARQ-ACK codebook on the target PUCCH resource. For details, refer to the detailed descriptions in the method examples. Details are not described herein again.

For example, when the communication apparatus 1100 is configured to implement the function of the network device in the method 800 provided in embodiments of this application, the processor 1110 may be configured to: configure a plurality of PUCCH resource sets for a terminal, where each of the plurality of PUCCH resource sets includes at least one first PUCCH resource, all PUCCH resources included in each of the plurality of PUCCH resource sets are in a frequency domain resource of a second time-frequency resource in frequency domain, the second time-frequency resource corresponds to a second time unit in time domain, the second time unit includes one or more symbols, the frequency domain resource corresponding to the second time-frequency resource includes a plurality of subbands, the plurality of subbands are consecutive non-overlapping frequency domain resources on the frequency domain resource corresponding to the second time-frequency resource, the plurality of subbands are on one carrier, the one or more symbols in the second time unit have different symbol categories on the plurality of subbands, and the first PUCCH resource satisfies: a frequency domain resource of the first PUCCH resource is in one of the plurality of subbands, and a symbol category, of a time domain resource corresponding to the first PUCCH resource in the second time unit, on the subband to which the first PUCCH resource belongs is uplink, flexible, or full duplex; determine, from the plurality of PUCCH resource sets, a PUCCH resource set corresponding to a payload size of a HARQ-ACK codebook as a target resource set, where the HARQ-ACK codebook is generated by the terminal; determine a PUCCH resource in the target PUCCH resource set as a target PUCCH resource; and receive the HARQ-ACK codebook on the target PUCCH resource. For details, refer to the detailed descriptions in the method examples. Details are not described herein again.

The communication apparatus 1100 may further include at least one memory 1120, configured to store program instructions and/or data. The memory 1120 is coupled to the processor 1110. The coupling in this embodiment of this application is an indirect coupling or a communication connection between apparatuses, units, or modules, may be in an electrical form, a mechanical form, or another form, and is used for information exchange between the apparatuses, the units, or the modules. The processor 1110 may cooperate with the memory 1120. The processor 1110 may execute the program instructions stored in the memory 1120. At least one of the at least one memory may be included in the processor.

The communication apparatus 1100 may further include a communication interface 1130, configured to communicate with another device by using a transmission medium, so that an apparatus used in the communication apparatus 1100 can communicate with the another device. For example, when the communication apparatus 1100 is configured to implement a function of a network device in the method provided in embodiments of this application, the another device may be a terminal. When the communication apparatus 1100 is configured to implement a function of a terminal in the method provided in embodiments of this application, the another device may be a network device. The communication interface 1130 may be, for example, a transceiver, an interface, a bus, a circuit, or an apparatus that can implement receiving and sending functions. The processor 1110 may receive and send data and/or information through the communication interface 1130, and is configured to implement the method performed by the network device or the terminal in the embodiment corresponding to FIG. 3, FIG. 6, or FIG. 8.

A specific connection medium between the processor 1110, the memory 1120, and the communication interface 1130 is not limited in this embodiment of this application. In this embodiment of this application, in FIG. 11, the processor 1110, the memory 1120, and the communication interface 1130 are connected by using a bus 1140. The bus 1140 is represented by a bold line in FIG. 11, and a manner of connection between other components is merely described as an example, and constitutes no limitation. The bus may be classified into an address bus, a data bus, a control bus, or the like. For ease of representation, only one bold line is used for representation in FIG. 11, but this does not mean that there is only one bus or only one type of bus.

Figure 12:
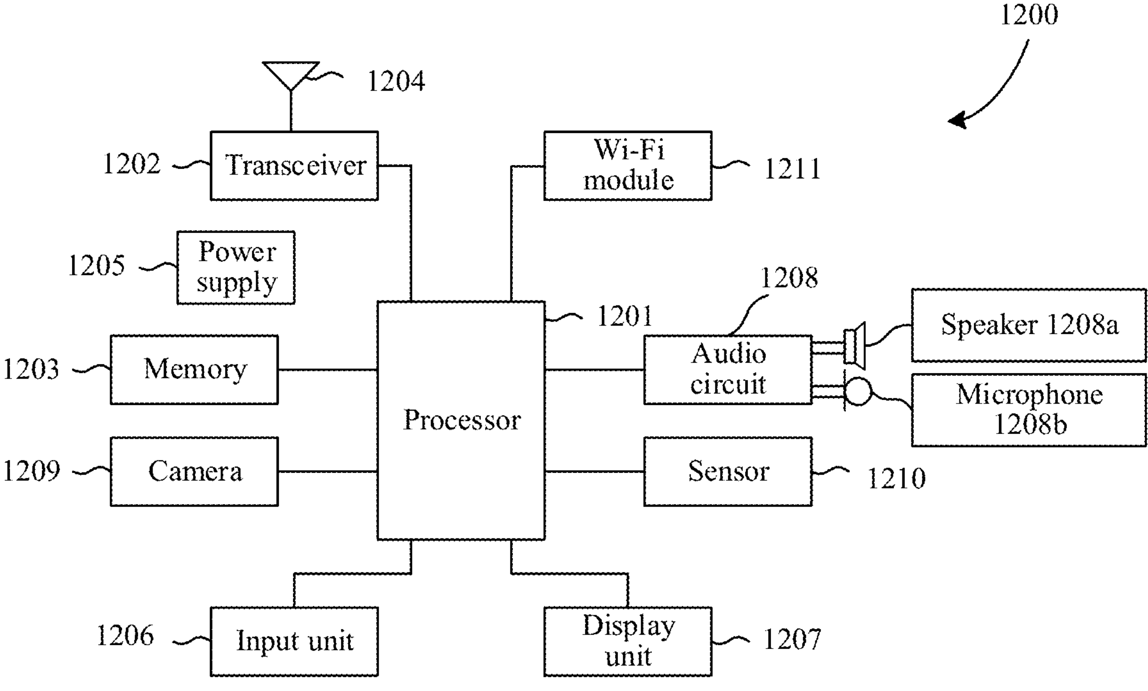
FIG. 12 is a block diagram of a structure of a terminal according to an embodiment of this application.

FIG. 12 is a diagram of a structure of a terminal according to an embodiment of this application. The terminal 1200 has a function of the terminal shown in FIG. 3, FIG. 6, or FIG. 8, and the terminal 1200 may be used in the communication system 100 shown in FIG. 1. As shown in FIG. 12, the terminal 1200 includes a processor 1201 and a transceiver 1202. Optionally, the terminal 1200 further includes a memory 1203. The processor 1201, the transceiver 1202, and the memory 1203 may communicate with each other by using an internal connection path, to transmit a control signal and/or a data signal. The memory 1203 is configured to store a computer program, and the processor 1201 is configured to invoke the computer program from the memory 1203 and run the computer program, to control the transceiver 1202 to receive a signal and send a signal. Optionally, the terminal 1200 may further include an antenna 1204, configured to send, by using a radio signal, uplink data or uplink control signaling output by the transceiver 1202. Optionally, the terminal 1200 further includes a wireless fidelity (Wi-Fi) module 1211, configured to access a wireless network.

The processor 1201 and the memory 1203 may be combined into one processing apparatus, and the processor 1201 is configured to execute program code stored in the memory 1203 to implement the foregoing functions. In an implementation, the memory 1203 may be integrated into the processor 1201, or may be independent of the processor 1201. The processor 1201 may correspond to the processing module 1010 in FIG. 10 or the processor 1110 in FIG. 11.

The transceiver 1202 may correspond to the transceiver module 1020 in FIG. 10 or the communication interface 1130 in FIG. 11. The transceiver 1202 may include a receiver (or referred to as a receiver machine or a receiver circuit) and a transmitter (or referred to as a transmitter machine or a transmitter circuit). The receiver is configured to receive a signal, and the transmitter is configured to transmit a signal.

Optionally, the terminal 1200 may further include a power supply 1205, configured to supply power to various components or circuits in the terminal 1200.

In addition, to improve a function of the terminal device, the terminal 1200 may further include one or more of an input unit 1206, a display unit 1207, an audio circuit 1208, a camera 1209, a sensor 1210, and the like. The audio circuit may further include a speaker 1208*a*, a microphone 1208*b*, and the like.

It should be understood that the terminal 1200 shown in FIG. 12 can implement processes related to the terminal in the method embodiment shown in FIG. 3, FIG. 6, or FIG. 8. Operations and/or functions of modules in the terminal 1200 are used to implement corresponding procedures in the foregoing method embodiments. For details, refer to the description in the foregoing method embodiments. To avoid repetition, detailed description is appropriately omitted herein.

When the terminal 1200 is configured to perform the operation procedure of the terminal in the foregoing method embodiments, the processor 1201 may be configured to perform an action that is implemented inside the terminal and that is described in the foregoing method embodiments, and the transceiver 1202 may be configured to perform an action that is of sending by the terminal to the network device or receiving by the terminal from the network device and that is described in the foregoing method embodiments.

For details, refer to the descriptions in the foregoing method embodiments. Details are not described herein again.

Figure 13:
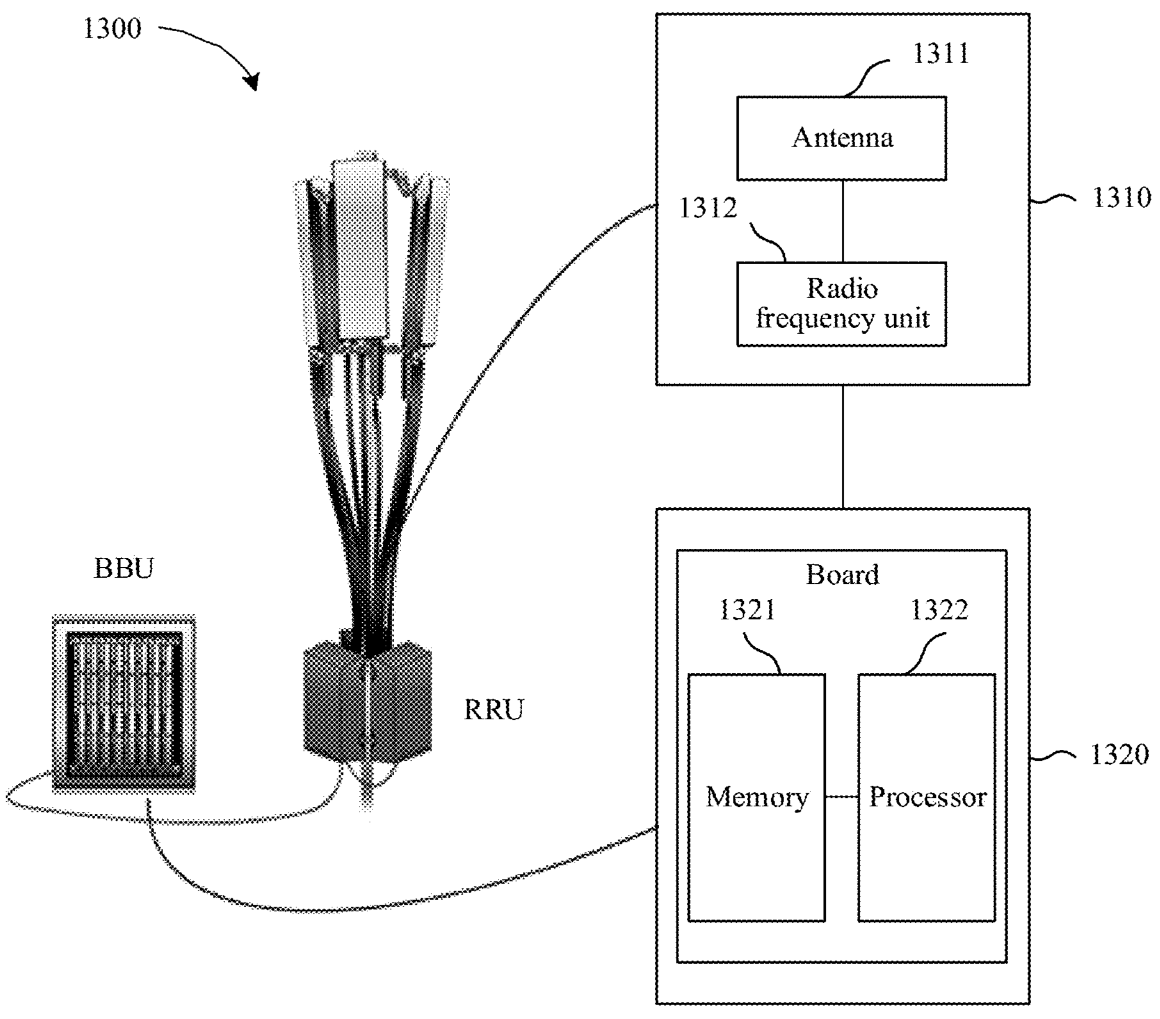
FIG. 13 is a diagram of a structure of a base station according to an embodiment of this application.

FIG. 13 is a diagram of a structure of a base station according to an embodiment of this application. The base station 1300 has a function of the network device shown in FIG. 3, FIG. 6, or FIG. 8. The base station 1300 may be used in the communication system 100 shown in FIG. 1. As shown in FIG. 13, the base station 1300 may include one or more radio frequency units, for example, a remote radio unit (RRU) 1310 and one or more BBU (which may also be referred to as a distributed unit) 1320. The RRU 1310 may be referred to as a transceiver unit, and may correspond to the transceiver module 1020 in FIG. 10 or the communication interface 1130 in FIG. 11. Optionally, the RRU 1310 may also be referred to as a transceiver, a transceiver circuit, or the like, and may include at least one antenna 1311 and a radio frequency unit 1312. Optionally, the RRU 1310 may include a receiving unit and a sending unit. The receiving unit may correspond to a receiver (or referred to as a receiver machine or a receiver circuit), and the sending unit may correspond to a transmitter (or referred to as a transmitter machine or a transmitter circuit). The RRU 1310 is mainly configured to receive and send radio frequency signals and convert a radio frequency signal and a baseband signal, for example, configured to perform an operation procedure related to the network device in the foregoing method embodiments, for example, send first indication information and second indication information to a terminal. The BBU 1320 is mainly configured to perform baseband processing, control the base station, and the like. The RRU 1310 and the BBU 1320 may be physically disposed together, or may be physically disposed separately, namely, a distributed base station.

The BBU 1320 is a control center of the base station, may also be referred to as a processing unit, may correspond to the processing module 1010 in FIG. 10 or the processor 1110 in FIG. 11, and is mainly configured to complete a baseband processing function, such as channel coding, multiplexing, modulation, and spectrum spreading. For example, the BBU (the processing unit) may be configured to control the base station to perform an operation procedure related to the network device in the foregoing method embodiments, for example, generate the first information, the third information, or the fourth information. Alternatively, the BBU (the processing unit) may be configured to control the base station to perform an operation procedure related to the network device in the foregoing method embodiments.

In an example, the BBU 1320 may include one or more boards, and a plurality of boards may jointly support a radio access network (for example, an LTE network) of a single access standard, or may separately support radio access networks (for example, an LTE network, a 5G network, or another network) of different access standards. The BBU 1320 further includes a memory 1321 and a processor 1322. The memory 1321 is configured to store necessary instructions and necessary data. The processor 1322 is configured to control the base station to perform a necessary action, for example, configured to control the base station to perform an operation procedure related to the network device in the foregoing method embodiments. The memory 1321 and the processor 1322 may serve one or more boards. In other words, a memory and a processor may be disposed on each board. Alternatively, a plurality of boards may share a same memory and a same processor. In addition, a necessary circuit may further be disposed on each board.

It should be understood that the base station 1300 shown in FIG. 13 can implement processes related to the network device in the method embodiment shown in FIG. 3, FIG. 6, or FIG. 8. Operations and/or functions of modules in the base station 1300 are used to implement corresponding procedures in the foregoing method embodiments. For details, refer to the description in the foregoing method embodiments. To avoid repetition, detailed description is appropriately omitted herein.

When the base station 1300 is configured to perform an operation procedure related to the network device in the foregoing method embodiments, the BBU 1320 may be configured to perform an action implemented inside the network device, and the RRU 1310 may be configured to perform an action such as sending or receiving of the network device. For details, refer to the descriptions in the foregoing method embodiments. Details are not described herein again.

It should be understood that the base station 1300 shown in FIG. 13 is merely a possible form of an access network device, and shall not constitute any limitation on this application. The method provided in this application is applicable to a network device in another form. For example, the network device includes an AAU, and may further include a CU and/or a DU, or include a BBU and an adaptive radio unit (ARU) or a BBU. A specific form of the network device is not limited in this application.

This application further provides a chip system. The chip system includes at least one processor, configured to implement a function in the method performed by the network device or the terminal in the embodiment shown in FIG. 3, FIG. 6, or FIG. 8, for example, receive or process data and/or information in the foregoing method.

In a possible design, the chip system further includes a memory, the memory is configured to store program instructions and data, and the memory is located inside or outside the processor.

The chip system may include a chip, or may include a chip and another discrete component.

This application further provides a communication system, including the foregoing network device and terminal.

This application further provides a computer-readable storage medium. The computer storage medium stores a computer program (which may also be referred to as code or instructions). When the computer program is run by a processor, the method performed by the network device or the terminal in the embodiment shown in FIG. 3, FIG. 6, or FIG. 8 is performed.

This application further provides a computer program product. The computer program product includes a computer program (which may also be referred to as code or instructions). When the computer program is run, a computer is enabled to perform the method performed by the network device or the terminal in the embodiment shown in FIG. 3, FIG. 6, or FIG. 8.

The processor in embodiments of this application may be an integrated circuit chip, and has a signal processing capability. In an implementation process, steps in the foregoing method embodiments can be implemented by using a hardware integrated logic circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps of the methods disclosed with reference to embodiments of this application may be directly performed by a hardware decoding processor, or performed by a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps of the foregoing method in combination with hardware of the processor.

The memory in embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM). By way of example and not limitation, many forms of RAMs are available, such as a static random access memory (SRAM), a dynamic random access memory (DRAM), a synchronous dynamic random access memory (SDRAM), double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory for the system and the method described in this specification aims to include but is not limited to these memories and any memory of another appropriate type.

Terms such as "unit" and "module" used in this specification may indicate computer-related entities, hardware, firmware, combinations of hardware and software, software, or software being executed.

A person of ordinary skill in the art may be aware that, illustrative logical blocks (illustrative logical block) and steps (step) described with reference to embodiments disclosed in this specification can be implemented by electronic hardware or a combination of computer software and electronic hardware. Whether the functions are implemented by hardware or software depends on specific applications and design constraints of the technical solutions. A person skilled in the art may use different methods to implement the described functions for each particular application, but it should not be considered that the implementation goes beyond the scope of this application. In the several embodiments provided in this application, it should be understood that the disclosed apparatus, device, and method may be implemented in other manners. For example, the described apparatus embodiments are merely examples. For example, division into the units is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces, and indirect couplings or communication connections between apparatuses or units may be implemented in an electrical, mechanical, or another form.

The units described as separate parts may or may not be physically separate, and parts displayed as units may or may not be physical units, may be located in one place, or may be distributed on a plurality of network units. Some or all of the units may be selected according to an actual requirement to achieve the objectives of the solutions in the embodiments.

In addition, functional units in embodiments of this application may be integrated into one processing unit, or each unit may exist alone physically, or two or more units may be integrated into one unit.

In the foregoing embodiments, all or some of the functions of the functional units may be implemented by using software, hardware, firmware, or any combination thereof. When software is used to implement the functions, all or some of the functions may be implemented in a form of a computer program product. The computer program product includes one or more computer instructions (programs). When the computer program instructions are loaded and executed on a computer, the procedures or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), or a semiconductor medium (for example, a solid state disk (SSD)).

When the function is implemented in a form of a software functional unit and sold or used as an independent product, the function may be stored in a computer-readable storage medium. Based on such an understanding, the technical solutions of this application essentially, or the part contributing to the conventional technology, or some of the technical solutions may be implemented in a form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a ROM, a RAM, a magnetic disk, or an optical disc.

The foregoing descriptions are merely some embodiments of this application. However, the protection scope of this application is not limited thereto. Any change or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, wherein the method comprises:

determining a target candidate physical downlink shared channel (PDSCH) reception occasion from a first time-frequency resource, wherein the target candidate PDSCH reception occasion comprises at least one symbol, the target candidate PDSCH reception occasion is used to receive a PDSCH, the first time-frequency resource corresponds to a first time unit in time domain, the first time unit comprises one or more symbols, a frequency domain resource corresponding to the first time-frequency resource comprises a plurality of subbands, the plurality of subbands are consecutive non-overlapping frequency domain resources on the frequency domain resource corresponding to the first time-frequency resource, the plurality of subbands are on one carrier, the one or more symbols in the first time unit have different symbol categories on the plurality of subbands, and in the target candidate PDSCH reception occasion a symbol category of each symbol on at least one of the plurality of subbands is downlink, flexible, or full duplex, or a symbol category of each symbol on a first subband in the plurality of subbands is downlink, flexible, or full duplex;

determining a hybrid automatic repeat request-acknowledgment (HARQ-ACK) codebook based on a plurality of target candidate PDSCH reception occasions; and sending, by a terminal, the HARQ-ACK codebook.

2. The method according to claim 1, wherein the first subband is a subband with a highest priority in the plurality of subbands.

3. The method according to claim 1, wherein the first subband is a subband specified by a network device in the plurality of subbands.

4. A communication method, wherein the method comprises:

determining, from a plurality of physical uplink control channel (PUCCH) resource sets, a first PUCCH resource set and a second PUCCH resource set that correspond to a payload size of a first hybrid automatic repeat request-acknowledgment (HARQ-ACK) codebook, wherein all PUCCH resources comprised in each of the plurality of PUCCH resource sets are in a frequency domain resource of a second time-frequency resource in frequency domain, the second time-frequency resource corresponds to a second time unit in time domain, the second time unit comprises one or more symbols, the frequency domain resource corresponding to the second time-frequency resource comprises a plurality of subbands, the plurality of subbands are consecutive non-overlapping frequency domain resources on the frequency domain resource corresponding to the second time-frequency resource, the plurality of subbands are on one carrier, the one or more symbols in the second time unit have different symbol categories on the plurality of subbands, the first PUCCH resource set comprises a first PUCCH resource, a frequency domain resource of the first PUCCH resource is in one of the plurality of subbands, and a symbol category, of a time domain resource corresponding to the first PUCCH resource in the second time unit, on the subband to which the first PUCCH resource belongs, is uplink, flexible, or full duplex;

determining a target PUCCH resource set from the first PUCCH resource set and the second PUCCH resource set;

determining a PUCCH resource in the target PUCCH resource set as a target PUCCH resource; and sending or receiving, the HARQ-ACK codebook on the target PUCCH resource.

5. The method according to claim 4, wherein all resources comprised in the first PUCCH resource set are first PUCCH resources; and the determining the target PUCCH resource set from the first PUCCH resource set and the second PUCCH resource set comprises:

determining the first PUCCH resource set as the target PUCCH resource set.

6. The method according to claim 4, wherein the method is performed by a terminal, the determining the target PUCCH resource set from the first PUCCH resource set and the second PUCCH resource set comprises:

receiving, by the terminal, first indication information from a network device, wherein the first indication information comprises a bitmap of N bits, the N bits correspond to N time units, a value of an $n^{th}$ bit in the bitmap indicates a PUCCH resource set that is in the first PUCCH resource set and the second PUCCH resource set and that corresponds to an $n^{th}$ time unit in the N time units, $1 \le n \le N$, and N and n are integers; and determining, by the terminal, the target PUCCH resource set based on a value of a bit corresponding to the second time unit in the bitmap.

7. The method according to claim 4, wherein the method is performed by a terminal, the determining the target PUCCH resource set from the first PUCCH resource set and the second PUCCH resource set comprises:

receiving, by the terminal, second indication information from a network device, wherein the second indication information comprises an identifier of a PUCCH resource set; and determining, by the terminal, a PUCCH resource set corresponding to the identifier in the first PUCCH resource set and the second PUCCH resource set as the target PUCCH resource set.

8. The method according to claim 4, wherein the method is performed by a network device, the method further comprises:

sending, by the network device, first indication information to a terminal, wherein the first indication information comprises a bitmap of N bits, the N bits correspond to N time units, a value of an $n^{th}$ bit in the bitmap indicates a target PUCCH resource set corresponding to an $n^{th}$ time unit in the N time units, $1 \le n \le N$, and N and n are integers; and the determining, by the network device, the target PUCCH resource set from the first PUCCH resource set and the second PUCCH resource set comprises:

determining, by the network device, the target PUCCH resource set based on a value of a bit corresponding to the second time unit in the bitmap.

9. The method according to claim 4, wherein the method is performed by a network device, the method further comprises: sending, by the network device, second indication information to a terminal, wherein the second indication information comprises an identifier of a PUCCH resource set; and the determining, by the network device, the target PUCCH resource set from the first PUCCH resource set and the second PUCCH resource set comprises:

determining, by the network device, a PUCCH resource set corresponding to the identifier in the first PUCCH resource set and the second PUCCH resource set as the target PUCCH resource set.

10. A communication apparatus, comprising:

at least one processor; and a memory storing programming instructions for execution by the at least one processor, the programming instructions instructing the communication apparatus to:

determine a target candidate physical downlink shared channel (PDSCH) reception occasion from a first time-frequency resource, wherein the target candidate PDSCH reception occasion comprises at least one symbol, the target candidate PDSCH reception occasion is used to receive a PDSCH, the first time-frequency resource corresponds to a first time unit in time domain, the first time unit comprises one or more symbols, a frequency domain resource corresponding to the first time-frequency resource comprises a plurality of subbands, the plurality of subbands are consecutive non-overlapping frequency domain resources on the frequency domain resource corresponding to the first time-frequency resource, the plurality of subbands are on one carrier, the one or more symbols in the first time unit have different symbol categories on the plurality of subbands, and in the target candidate PDSCH reception occasion a symbol category of each symbol on at least one of the plurality of subbands is downlink, flexible, or full duplex, or a symbol category of each symbol on a first subband in the plurality of subbands is downlink, flexible, or full duplex;

determine a hybrid automatic repeat request-acknowledgment (HARQ-ACK) codebook based on a plurality of target candidate PDSCH reception occasions; and send the HARQ-ACK codebook.

11. The communication apparatus according to claim 10, wherein the first subband is a subband with a highest priority in the plurality of subbands.

12. The communication apparatus according to claim 10, wherein the first subband is a subband specified by a network device in the plurality of subbands.

13. The communication apparatus according to claim 10, wherein the communication apparatus is a terminal.

14. A communication apparatus, comprising:

at least one processor; and a memory storing programming instructions for execution by the at least one processor, the programming instructions instructing the communication apparatus to:

determine, from a plurality of physical uplink control channel (PUCCH) resource sets, a first PUCCH resource set and a second PUCCH resource set that correspond to a payload size of a first hybrid automatic repeat request-acknowledgment (HARQ-ACK) codebook, wherein all PUCCH resources comprised in each of the plurality of PUCCH resource sets are in a frequency domain resource of a second time-frequency resource in frequency domain, the second time-frequency resource corresponds to a second time unit in time domain, the second time unit comprises one or more symbols, the frequency domain resource corresponding to the second time-frequency resource comprises a plurality of subbands, the plurality of subbands are consecutive non-overlapping frequency domain resources on the frequency domain resource corresponding to the second time-frequency resource, the plurality of subbands are on one carrier, the one or more symbols in the second time unit have different symbol categories on the plurality of subbands, the first PUCCH resource set comprises a first PUCCH resource, a frequency domain resource of the first PUCCH resource is in one of the plurality of subbands, and a symbol category, of a time domain resource corresponding to the first PUCCH resource in the second time unit, on the subband to which the first PUCCH resource belongs, is uplink, flexible, or full duplex;

determine a target PUCCH resource set from the first PUCCH resource set and the second PUCCH resource set;

determine a PUCCH resource in the target PUCCH resource set as a target PUCCH resource; and send or receive, the HARQ-ACK codebook on the target PUCCH resource.

15. The communication apparatus according to claim 14, wherein all resources comprised in the first PUCCH resource set are first PUCCH resources; and the determining the target PUCCH resource set from the first PUCCH resource set and the second PUCCH resource set comprises:

determining the first PUCCH resource set as the target PUCCH resource set.

16. The communication apparatus according to claim 14, wherein the communication apparatus is a terminal, the determining the target PUCCH resource set from the first PUCCH resource set and the second PUCCH resource set comprises:

receiving first indication information from a network device, wherein the first indication information comprises a bitmap of N bits, the N bits correspond to N time units, a value of an $n^{th}$ bit in the bitmap indicates a PUCCH resource set that is in the first PUCCH resource set and the second PUCCH resource set and that corresponds to an $n^{th}$ time unit in the N time units, $1 \leq n \leq N$, and N and n are integers; and determining the target PUCCH resource set based on a value of a bit corresponding to the second time unit in the bitmap.

17. The communication apparatus according to claim 14, wherein the communication apparatus is a terminal, the determining the target PUCCH resource set from the first PUCCH resource set and the second PUCCH resource set comprises:

receiving second indication information from a network device, wherein the second indication information comprises an identifier of a PUCCH resource set; and determining a PUCCH resource set corresponding to the identifier in the first PUCCH resource set and the second PUCCH resource set as the target PUCCH resource set.

18. The communication apparatus according to claim 14, wherein the communication apparatus is a network device and the communication apparatus is further caused to:

send first indication information to a terminal, wherein the first indication information comprises a bitmap of N bits, the N bits correspond to N time units, a value of an $n^{th}$ bit in the bitmap indicates a target PUCCH resource set corresponding to an $n^{th}$ time unit in the N time units, $1 \leq n \leq N$, and N and n are integers; and the determining the target PUCCH resource set from the first PUCCH resource set and the second PUCCH resource set comprises:

determining the target PUCCH resource set based on a value of a bit corresponding to the second time unit in the bitmap.

19. The communication apparatus according to claim 14, wherein the communication apparatus is a network device and the communication apparatus is further caused to:

send second indication information to a terminal, wherein the second indication information comprises an identifier of a PUCCH resource set; and the determining the target PUCCH resource set from the first PUCCH resource set and the second PUCCH resource set comprises:

determining a PUCCH resource set corresponding to the identifier in the first PUCCH resource set and the second PUCCH resource set as the target PUCCH resource set.

20. The communication apparatus according to claim 14, wherein the communication apparatus is a terminal or a network device.

* * * * *